United States Patent [19]

Okano et al.

[11] Patent Number: 5,424,619
[45] Date of Patent: Jun. 13, 1995

[54] DYNAMIC CONVERGENCE DEVICE FOR COLOR CATHODE-RAY TUBE

[75] Inventors: Nobuya Okano; Yukinobu Iguchi, both of Kanagawa; Hiromu Hosokawa, Chiba; Hiroshi Murayama, Kanagawa, all of Japan

[73] Assignee: Sony Corporation, Tokyo, Japan

[21] Appl. No.: 243,860

[22] Filed: May 17, 1994

[30] Foreign Application Priority Data

May 19, 1993 [JP] Japan .................................. 5-117319

[51] Int. Cl.⁶ .............................................. H01J 29/51
[52] U.S. Cl. .............................................. 315/368.15
[58] Field of Search ...................... 315/368.15, 368.16

[56] References Cited

U.S. PATENT DOCUMENTS

| | | | |
|---|---|---|---|
| 3,452,240 | 6/1969 | Tokita et al. ........................... | 315/13 |
| 3,513,350 | 5/1970 | Ohgoshi et al. ........................ | 315/13 |
| 3,548,248 | 12/1970 | Tokita et al. . | |
| 3,638,064 | 1/1972 | Hosoya et al. . | |

FOREIGN PATENT DOCUMENTS

0591934A1  4/1994  European Pat. Off. ........ H04N 9/28

*Primary Examiner*—Theodore M. Blum
*Attorney, Agent, or Firm*—Hill, Steadman & Simpson

[57] ABSTRACT

A dynamic convergence device in a color cathode-ray tube has two pairs of confronting high- and low-voltage electrode plates disposed in a color cathode-ray tube bulb and arranged such that a central electron beam will pass between the high-voltage electrode plates and side electron beams will pass between the high-voltage electrode plates and the low-voltage electrode plates. A first parallel-connected circuit is composed of a first resistor and a first diode which are connected between the low-voltage electrode plates and a high DC voltage source. A second parallel-connected circuit is composed of a second resistor and a second diode which are connected between the high-voltage electrode plates and the high DC voltage source. A convergence voltage source generates a convergence voltage which is composed of a vertical parabolic wave voltage added to a modulated voltage in horizontal blanking intervals thereof which is produced by amplitude-modulating a horizontal parabolic wave with a vertical parabolic wave. A first capacitor is connected between the convergence voltage source and the low-voltage electrode plates or the high-voltage electrode plates, and a second capacitor is connected between the low-voltage electrode plates or the high-voltage electrode plates and ground.

9 Claims, 18 Drawing Sheets

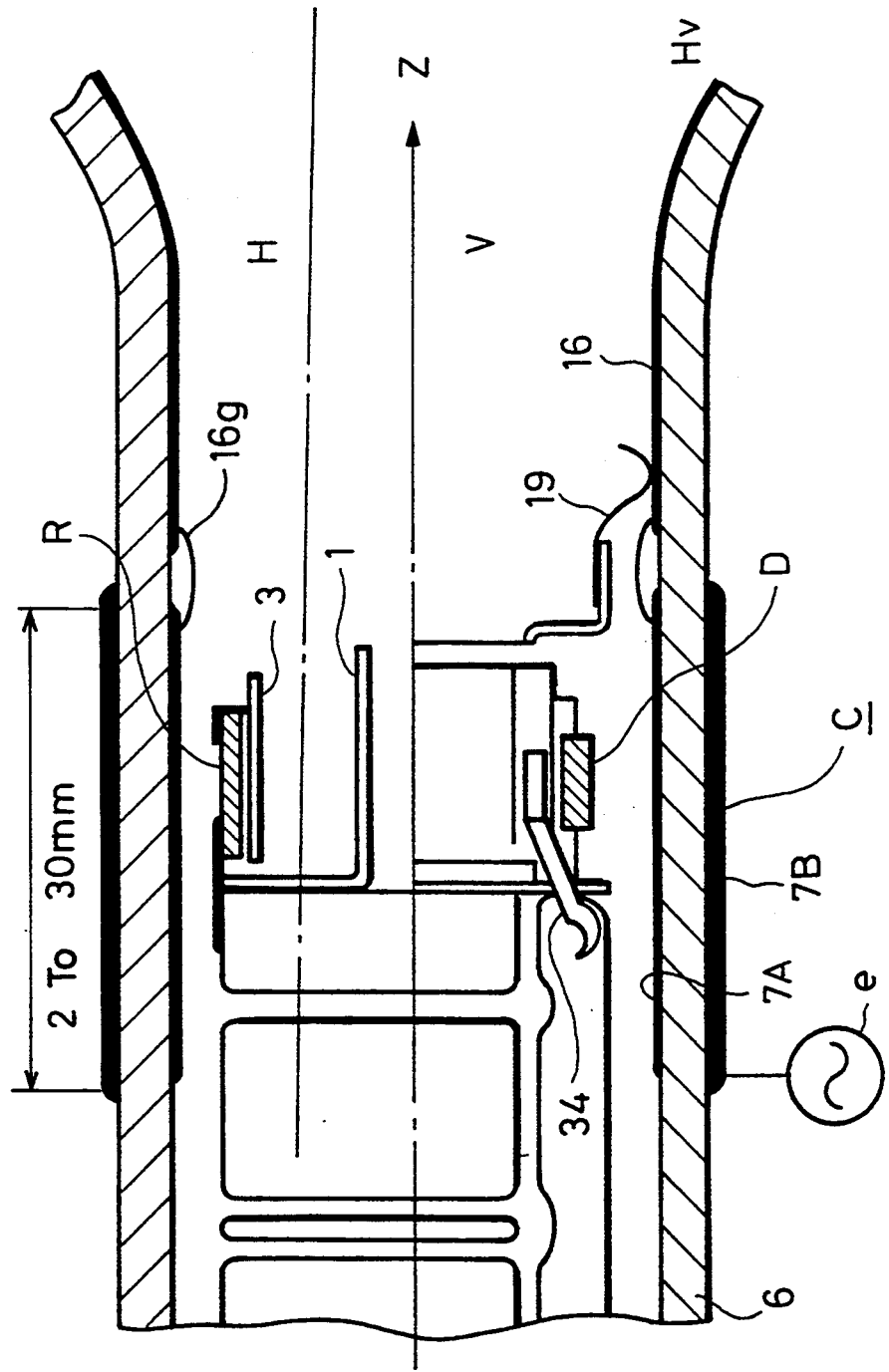

DYNAMIC CONVERGENCE DEVICE FOR COLOR CATHODE-RAY TUBE

BACKGROUND OF THE INVENTION

1. Field of the Invention

The present invention relates to a device for achieving dynamic convergence in a color cathode-ray tube.

2. Description of the Related Art

When the deflecting magnetic field of a deflection yoke is a uniform magnetic field in an in-line three-beam color cathode-ray tube, convergence errors in the shape of vertical bows are produced on the screen of the color cathode-ray tube, as shown in FIG. 1 of the accompanying drawings. In FIG. 1, R and B represent patterns produced by opposite side beams, i.e., red and blue beams. Many color cathode-ray tubes are designed to accomplish dynamic convergence by imparting a large distortion, e.g., a barrel distortion or a pincushion distortion, to the deflecting magnetic field generated by the deflection yoke. However, this approach has a problem because it tends to distort electron beam spots or put them out of focus on a peripheral region of the screen of the color cathode-ray tube.

One solution has been to generate a uniform magnetic field from a deflection yoke and pass a convergence current through a quadrupole coil disposed behind the deflection yoke. Because the deflecting magnetic field is still distorted, distortions of electron beam spots in the peripheral region of the screen of the color cathode-ray tube cannot fully be removed. Furthermore, the fact that the convergence current passing through the quadrupole coil is controlled makes this convergence design unsuitable for use in a multiple scanning frequency monitor, and makes it difficult to carry out accurate waveform control, resulting in difficulty in fine adjustment of the convergence in small areas on the screen.

In some special applications, a convergence voltage modulated by an external transformer is applied through a coaxial cable to the convergence plate of an electron gun. Though the application of such a convergence voltage is effective to improve the convergence in the peripheral region of the screen of the color cathode-ray tube, the arrangement is expensive and cannot be introduced into color television sets for consumer use since the external transformer is a high-voltage transformer.

There has also been proposed a dynamic convergence device having a high resistor connected between a pair of inner electrodes and a pair of outer electrodes in a color cathode-ray tube, and conductive layers disposed respectively on inner and outer surfaces of the bulb of the color cathode-ray tube, thus forming a capacitor. A convergence voltage is applied from an external source through the capacitor to the pair of outer electrodes in the color cathode-ray tube.

Such a conventional dynamic convergence device, which is disclosed in Japanese patent publication No. 55-20633, will be described below with reference to FIG. 2 of the accompanying drawings. FIG. 2 shows a bipotential-type electron gun device 22, sold under the trademark "Trinitron", with three electron beams of red, green, and blue arranged in line within a color cathode-ray tube bulb 6.

The electron gun device 22 has three cathodes 23R, 23G, 23B for red, green, and blue electron beams R, G, B, respectively, the cathodes 23R, 23G, 23B arranged in line in a horizontal plane, and first through fourth grids 12, 13, 14, 15 arrayed successively in coaxial relationship. The electron gun device 22 also has a convergence device 5 disposed behind the fourth grid 15. The second and third grids 13, 14 serve as a common prefocusing electron lens for the red, green, and blue electron beams R, G, B. The third and fourth grids 14, 15 form a common main electron lens. The red, green, and blue electron beams R, G, B emitted from the respective cathodes 23R, 23G, 23B are converged substantially centrally in the main electron lens by the prefocusing electron lens, and then diverged past the center of the main electron lens. The central green electron beam G passes between a pair of high-voltage electrode plates 1, 2 of the convergence device 5. The red electron beam R passes between the high-voltage electrode plate 2 and a low-voltage electrode plate 4, and the blue electron beam B passes between the high-voltage electrode plate 1 and a low-voltage electrode plate 3.

The color cathode-ray tube bulb 6 has a neck 6N housing the electron gun device 22 therein. Semicircular conductive layers 7A, 7B which jointly form a capacitor 7 are bonded to respective inner and outer wall surfaces of a bulb wall of the neck 6N which houses the convergence device 5. An insulating plate 24 of ceramic or the like extends over the fourth grid 15 and the low-voltage electrode plate 3. The insulating plate 24 is coated on one half of a surface thereof over the fourth grid 15 with a resistive film 25 which has opposite ends connected to respective electrodes 26, 27, thus forming a high resistor 28. To the other half of the surface of the insulating plate 24, there is attached another capacitor 32 which comprises a thin dielectric layer 29 of barium titanate and electrodes 30, 31 of stainless steel brazed to respective opposite surfaces of the thin dielectric layer 29 by a silver solder. A conductive member 33 is welded to the electrode 26 of the high resistor 28 and to the fourth grid 15. A conductive leaf spring 34 extends between and is welded to the electrode 27 of the high resistor 28 and the electrode 30 of the capacitor 32. The conductive leaf spring 34 has an end held in contact with the inner conductive layer 7A. A conductive member 35 is welded to the other electrode 31 of the capacitor 32 and to the low-voltage electrode plate 3.

The high-voltage electrode plates 1, 2 are interconnected by a lead 10. The electrode plate 2 is connected to the fourth grid 15 by a lead 11. An inner conductive layer 16 is disposed on an inner surface of a funnel of the color cathode-ray tube bulb 6 and has an extension 16a extending into the neck 6N. A conductive resilient contact member 17 attached to the fourth grid 15 is held in contact with the extension 16a for supplying the fourth grid 15 and the high-voltage electrode plates 1, 2 with an anode voltage that is applied to the inner conductive layer 16 from an external conductor of an axial anode button attached to the funnel of the bulb 6. A conductive semicircular leaf spring 18 which is inserted in the end of the neck 6N near the funnel of the bulb 6 is held in contact with a conductive resilient contact member 19 attached to the low-voltage electrode plate 4. An inner conductor to which a capacitor voltage from the anode button is connected through a lead 21 covered with an insulating pipe 20 to the leaf spring 18 for supplying a convergence voltage to the low-voltage electrode plates 3, 4. To form the extension 16a of the inner conductive layer 16 in the neck 6N of the bulb 6, the conductive layers 7A, 7B are of a semicircular shape out of contact with the extension 16a.

The conventional dynamic convergence device will further be described below with reference to FIGS. 2 and 3 of the accompanying drawings, FIG. 3 being illustrative of an equivalent circuit of the conventional dynamic convergence device. In FIG. 3, a dynamic convergence signal from a signal source 36 is supplied through the capacitor 7 across the bulb 6 and the capacitor 32 in the bulb 6 to the low-voltage electrode plates 3, 4. An anode voltage from a high-voltage power supply Eb is supplied directly to the high-voltage electrode plates 1, 2 and through the resistor 28 in the bulb 6 to the inner conductive layer 7A. The capacitor 32 prevents the anode voltage from being applied to the low-voltage electrode plates 3, 4. A convergence voltage, which is produced by dividing the anode voltage from the high-voltage power supply Eb with resistors 37, 38, is applied to the low-voltage electrode plates 3, 4. The reference numeral 39 represents the internal resistance of the signal source 36, and the reference numeral 40 the coating capacitance. The capacitor 7 has a capacitance ranging from about 100 pF to 200 pF if the color cathode-ray tube bulb 6 has a diameter of 29 mm at the neck 6N, and is required to have a dielectric strength of about 2 kV. The high resistor 28 has a resistance ranging from about 30 MΩ to 100 MΩ, for example.

The conventional dynamic convergence device suffers the following drawbacks: Where the convergence voltage is supplied from an external source to the dynamic convergence device within the bulb through the capacitor composed of the inner and outer conductive layers on the bulb, if the convergence voltage is produced by amplitude-modulating a DC voltage slightly lower than the anode voltage with horizontal and vertical parabolic waves, then the low-frequency component, i.e., the vertical parabolic component, cannot be transmitted. Therefore, a convergence voltage which is produced by amplitude-modulating a DC voltage slightly lower than the anode voltage with only a vertical parabolic wave is supplied from an external source to the dynamic convergence device within the bulb through the capacitor composed of the inner and outer conductive layers on the bulb, whereas a horizontal parabolic wave is supplied to the deflection yoke or the quadrupole coil. However, such a system arrangement is complex, and fails to improve any defocused condition of the electron beams in the peripheral region of the screen of the color cathode-ray tube.

The above shortcomings will be described in greater detail below. If the capacitor 7 has a capacitance of 50 pF and the high resistor 28 has a resistance of 50 MΩ, then their time constant $\tau$ is given by:

$$\tau = 50 \times 10^{-12} \times 50 \times 10^6 = 2.5 \ msec.$$

Since the time constant $\tau$ is sufficiently longer than the period of a horizontal deflection signal having a frequency of 15.75 kHz, the capacitor 7 can transmit an AC signal having horizontal periods. However, because a vertical deflection signal having a frequency of 60 Hz, the capacitor 7 is unable to pass an AC signal of vertical frequency unless the resistance of the high resistor 28 or the capacitance of the capacitor 7 is of a value that is about 15 times the above value.

Use of such a large capacitance for the capacitor 7 is not practical. If a resistor having a greater resistance were used as the high resistor 28, then a convergence error would be produced as a voltage change of several voltages would be caused by even a small current of several tens of nanoamperes. Consequently, the time constant $\tau$ is limited up to several milliseconds.

In view of the above difficulties, there has been proposed a dynamic convergence device as disclosed in Japanese patent application No. 4-258567. The proposed dynamic convergence device is designed to reduce electron beam spot distortions in the peripheral region of the screen of the color cathode-ray tube, allow the electron beams to focus well on the screen, reduce a focusing current to be supplied to a focusing device for focusing the electron beams, facilitate fine convergence adjustment, permit itself to be easily incorporated into a multiple scanning frequency monitor, and facilitate local voltage waveform shaping. Several embodiments of this dynamic convergence device will be described below as first, second, and third prior examples.

The first prior example will first be described below with reference to FIG. 4 of the accompanying drawings. An equivalent circuit of the first prior example is shown in FIG. 5 of the accompanying drawings. In the first prior example, the proposed dynamic convergence device is incorporated in an in-line three-beam color cathode-ray tube which employs a shadow mask. Four electrode plates which are used as convergence electrode plates in a color cathode-ray tube sold under the trademark of Trinitron are employed in place of a component that is usually referred to as a convergence cup. More specifically, a pair of high-voltage electrode plates 1, 2 confronting each other and a pair of low-voltage electrode plates 3, 4 disposed outwardly of the high-voltage electrode plates 1, 2 in confronting relationship to the high-voltage electrode plates 1, 2 are arranged horizontally in the bulb 6 of a color cathode-ray tube such that a central electron beam (green electron beam) passes between the high-voltage electrode plates 1, 2 and side electron beams (red and blue electron beams) pass between the low-voltage electrode plates 3, 4. The electrode plates 1~4 have a length of about 10 mm along the axis Z of the tube 6, and adjacent two of the electrode plates 1~4 are spaced about 5 mm from each other.

A parallel-connected circuit of a high resistor R having a resistance of several tens of MΩ and a diode D having a reverse breakdown voltage of about 1 kV or higher is connected between the high-voltage electrode plates 1, 2 and the low-voltage electrode plates 3, 4 such that the diode D has its cathode connected to the high-voltage electrode plates 1, 2. The high resistor R is welded to the low-voltage electrode plate 3. The diode D is mounted on the low-voltage electrode plate 4. A resistor r is connected in series with the diode D.

An inner conductive layer 16 of carbon is coated on the inner surface of the bulb 6 which extends from its funnel to its neck. A high DC voltage (anode voltage) $V_H$ of 30 kV, for example, is applied to the inner conductive layer 16. The high-voltage electrode plates 1, 2 are connected to the inner conductive layer 16 through a resilient conductive member 19. The inner conductive layer 16 has an insulating gap 16g defined therein that separates a portion thereof, which is about 20 to 30 mm long in the neck, as an inner conductive layer 7A. An outer conductive layer 7B is disposed on an outer surface of the bulb 6 in confronting relationship to the inner conductive layer 7A, thus forming a cylindrical capacitor C with its dielectric medium composed of the portion of the bulb 6 between the inner and outer conductive layers 7A, 7B. The low-voltage electrode plates 3, 4 are connected through a resilient conductive member 34 to the inner conductive layer 7A of the capacitor C. A convergence voltage Vc' (~) supplied from a power supply "e" is applied to the outer conductive layer 7B of the capacitor C.

The convergence voltage Vc' (~) is a voltage produced by adding a vertical parabolic voltage to a modulated voltage in its horizontal blanking intervals which is produced by amplitude-modulating a horizontal parabolic wave shown in FIG. 6A with a vertical parabolic wave and which has an absolute amplitude of $\Delta V$ (e.g., 1 kV), the convergence voltage Vc' (~) having a level varying between 0 V and $-\Delta V$ as shown in FIG. 6B.

If it were not for the diode D, then the voltage applied to the low-voltage electrode plates 3, 4 would be of an AC-clamped waveform as shown in FIG. 6C, i.e., the vertical-frequency component would not accurately be transmitted. With the diode D connected parallel to the high resistor R such that the cathode thereof is connected to the high-voltage electrode plates 1, 2, a convergence voltage Vc (~) applied to the low-voltage electrode plates 3, 4 is suppressed below the high DC voltage $V_H$ by the diode D, and has a negative level varying from $V_H$ to $V_H - \Delta V$, as shown in FIG. 6D, allowing the vertical-frequency component to be transmitted reliably.

The convergence voltage Vc' (~) applied to the capacitor C may be of an AC-clamped voltage as shown in FIG. 6C. In this case, the voltage having the waveform shown in FIG. 6D is also applied to the low-voltage electrode plates 3, 4.

Since reliable dynamic convergence can be achieved by the above dynamic convergence device, the magnetic field generated by the deflection yoke may be a uniform magnetic field, thereby preventing the electron beam spots from being defocused in the peripheral region of the screen of the color cathode-ray tube.

There is developed a potential difference between the high-voltage electrode plates 1, 2 and the low-voltage electrode plates 3, 4 at the center of the screen of the color cathode-ray tube. Therefore, static convergence in the electron gun itself should be established taking into account such a potential difference.

An equivalent circuit of the second prior example for a Trinitron color cathode-ray tube which comprises an in-line three-beam color cathode-ray tube with an aperture grille used instead of a shadow mask will be described below with reference to FIG. 7. In the color cathode-ray tube, a pair of high-voltage electrode plates 1, 2 confronting each other for effecting static convergence on three electron beams and a pair of low-voltage electrode plates 3, 4 disposed outwardly of the high-voltage electrode plates 1, 2 in confronting relationship thereto are arranged horizontally in the bulb 6 such that a central electron beam (green electron beam) passes between the high-voltage electrode plates 1, 2 and side electron beams (red and blue electron beams) pass between the high-voltage electrode plates 1, 2 and the low-voltage electrode plates 3, 4.

A high resistor R is connected parallel to a series-connected circuit of a diode D and a resistor r. The parallel-connected circuit has a terminal on the side of the anode of the diode D, the terminal being connected to the low-voltage electrode plates 3, 4. An inner conductive layer 16 of carbon is coated on the inner surface of the bulb 6 which extends from its funnel to its neck. A high voltage (anode voltage) $V_H$ of 30 kV, for example, is applied to the inner conductive layer 16. The high-voltage electrode plates 1, 2 are connected to the inner conductive layer 16 through a resilient conductive member 19. Unlike the arrangement shown in FIG. 4, the high voltage $V_H$ is divided into a voltage Vc of 29 kV, for example, by a voltage divider 40 comprising a series-connected circuit of resistors (resistive layers) Ra, Rb in the bulb of the color cathode-ray tube. A terminal where the voltage Vc appears is connected to the cathode of the diode D. In order to stabilize the voltage Vc, a capacitor Ca is connected parallel to the resistor Ra of the voltage divider 40 to which the high voltage $V_H$ is applied.

As with the arrangement shown in FIG. 4, the inner conductive layer 16 has an insulating gap 16g defined therein that separates a portion thereof, which is about 20 to 30 mm long in the neck, as an inner conductive layer 7A. An outer conductive layer 7B is disposed on an outer surface of the bulb 6 in confronting relationship to the inner conductive layer 7A, thus forming a cylindrical capacitor C with its dielectric medium composed of the portion of the bulb 6 between the inner and outer conductive layers 7A, 7B. The low-voltage electrode plates 3, 4 are connected through a resilient conductive member 34 to the inner conductive layer 7A of the capacitor C. A convergence voltage Vc' (~) supplied from a power supply "e" is applied to the outer conductive layer 7B of the capacitor C.

The convergence voltage Vc' (~) is a voltage produced by adding a vertical parabolic voltage to a modulated voltage in its horizontal blanking intervals which is produced by amplitude-modulating a horizontal parabolic wave shown in FIG. 6A with a vertical parabolic wave and which has an absolute amplitude of $\Delta V$ (e.g., 1 kV), the convergence voltage Vc' (~) having a level varying between 0 V and $-\Delta V$ as shown in FIG. 6B.

Since static convergence and dynamic convergence can be achieved by the above dynamic convergence device, the magnetic field generated by the deflection yoke may be a uniform magnetic field, thereby preventing the electron beam spots from being defocused in the peripheral region of the screen of the color cathode-ray tube.

The third prior example will be described below with reference to FIGS. 8A through 8C. In each of the above examples, a current flows, upon knocking, from the high-voltage electrode plates to the low-voltage electrode plates as a reverse current with respect to the diode. The third prior example is arranged to avoid damage to the diode due to such a reverse current. The third prior example is shown in FIG. 8C. Before describing the third prior example with reference to FIG. 8C, other conventional arrangements will first be described below with reference to FIGS. 8A and 8B.

FIG. 8A shows a conventional arrangement disposed in the bulb 6 of a color cathode-ray tube. As with the first prior example, the conventional arrangement shown in FIG. 8A includes a diode D, a capacitor C including an inner conductive layer 7A, a high resistor R, a high-voltage electrode (anode or the like) 41, an electrode 42 adjacent thereto, a convergence (C) shield electrode (high-voltage electrode plate) 43, and a convergence (C) plate electrode (low-voltage electrode plate) 44. The C shield electrode 43 and the C plate electrode 44 are electrodes for effecting static convergence on a central electron beam and side electron beams in a Trinitron electron gun. The C shield electrode 43 also serves to shield the central electron beam. A voltage slightly lower than a high-voltage for the electron gun is applied to the C plate electrode 44, and a voltage higher than the voltage applied to the C plate electrode 44 is applied to the C shield electrode 43.

In FIG. 8A, upon knocking, the high-voltage electrode 41 is grounded, and a negative voltage is applied to the other electrodes. A maximum voltage applied during the knocking process is in the range of from −50 to −60 kV. When the maximum voltage is applied, there are produced electric discharges between the electrode 42 adjacent to the high-voltage electrode 41, the high-voltage electrode 41, and the inner conductive layer (inner coated carbon layer) 7A of the capacitor 4. Due to the electric discharge between the inner conductive layer 7A of the capacitor 4 and the electrode 42, a current flows from the C shield electrode 43 under the high voltage to the C plate electrode 44 as a reverse current that flows through the diode D, tending to damage the diode D.

FIG. 8B shows another conventional arrangement for avoiding the above problem. In FIG. 8B, the inner conductive layer 7A of the capacitor 7 is separate from an inner conductive layer 45 connected to the high-voltage electrode 41 with an insulating gap g defined between the inner conductive layers 7A, 41. The insulating gap g prevents a reverse current from flowing through the diode D when the electric discharge occurs. However, the structure shown in FIG. 8B has a problem in that charging of the gap adversely affects the electron beams.

According to the third prior example shown in FIG. 8C, a shield electrode 46 in the form of a circular cap is disposed between the high-voltage electrode 41 and the C plate electrode (low-voltage electrode plate) 44 in contact with an inner wall surface of the neck of the bulb 6. FIGS. 9A through 9D are plan, cross-sectional, bottom, and cross-sectional views, respectively, of the shield electrode 46. The shield electrode 46 has an oblong hole 46a defined centrally therein for passage therethrough of three electron beams arranged in line. The shield electrode 46 is not connected to the other electrodes including the high-voltage electrode 41. The shield electrode 46 can avoid damage to the diode D due to an electric discharge upon knocking. Indexing the shield plate 46 can prevent the high-voltage electrode 41 and the C plate electrode 44 from being brought out of axial alignment with each other.

The dynamic convergence devices according to the first, second, and third prior examples are effective to reduce electron beam spot distortions in the peripheral region of the screen of the color cathode-ray tube, allow the electron beams to focus well on the screen, reduce a focusing current to be supplied to a focusing device for focusing the electron beams, facilitate fine convergence adjustment, permit itself to be easily incorporated into a multiple scanning frequency monitor, and facilitate local voltage waveform shaping.

However, the first, second, and third prior examples suffer shortcomings described below. If a color video signal supplied to the color cathode-ray tube is a signal having an abrupt level change, such as a window signal, then since the beam current varies greatly, the high DC voltage also varies with the beam current. Such a condition will be described below with respect to the first and second prior examples shown in FIGS. 5 and 7. When the high DC voltage drops, a forward potential gradient is developed across the diode D which is connected between the high-voltage electrode plates 1, 2 and the low-voltage electrode plates 3, 4, rendering the diode D conductive. Therefore, the potential difference between the high-voltage electrode plates 1, 2 and the low-voltage electrode plates 3, 4 is kept uniform, achieving convergence. When the high DC voltage increases, however, a reverse potential gradient is developed across the diode D. In order to increase the voltage applied to the low-voltage electrode plates 3, 4 up to a level required to achieve convergence, it is necessary to charge the capacitor C through the resistor R. Therefore, upon an increase in the high DC voltage, the voltage applied to the low-voltage electrode plates 3, 4 increases with a time constant $\tau = R \times C$ where R is the resistance of the resistor R and C the capacitance of the capacitor C. In the event that the high DC voltage varies greatly, the voltage applied to the low-voltage electrode plates 3, 4 cannot keep up quickly, and may not reach a level required for convergence, resulting in a convergence error.

OBJECTS AND SUMMARY OF THE INVENTION

It is therefore an object of the present invention to provide a dynamic convergence device which can reduce electron beam spot distortions in the peripheral region of the screen of the color cathode-ray tube, allow the electron beams to focus well on the screen, reduce a focusing current to be supplied to a focusing device for focusing the electron beams, facilitate fine convergence adjustment, permit itself to be easily incorporated into a multiple scanning frequency monitor, facilitate local voltage waveform shaping, and avoid a convergence error produced when the voltage applied to low-voltage electrode plates to keep up quickly with changes in a high DC voltage.

According to the present invention, there is provided a dynamic convergence device in a color cathode-ray tube, comprising a color cathode-ray tube bulb, a pair of high-voltage electrode plates confronting each other disposed in the color cathode-ray tube bulb, a pair of low-voltage electrode plates disposed in the color cathode-ray tube bulb outwardly of the high-voltage electrode plates in confronting relationship thereto, the high- and low-voltage electrode plates being arranged such that a central electron beam will pass between the high-voltage electrode plates and side electron beams will pass between the high-voltage electrode plates and the low-voltage electrode plates, a high DC voltage source, a first parallel-connected circuit composed of a first resistor and a first diode which are connected between the low-voltage electrode plates and the high DC voltage source, a second parallel-connected circuit composed of a second resistor and a second diode which are connected between the high-voltage electrode plates and the high DC voltage source, a convergence voltage source for generating a convergence voltage which is composed of a vertical parabolic wave voltage added to a modulated voltage in horizontal blanking intervals thereof which is produced by amplitude-modulating a horizontal parabolic wave with a vertical parabolic wave, a first capacitor connected between the convergence voltage source and the low-voltage electrode plates or the high-voltage electrode plates, and a second capacitor connected between the low-voltage electrode plates or the high-voltage electrode plates and ground.

When the high DC voltage is constant, the first and second capacitors are charged. Therefore, the voltage applied to the high-voltage electrode plates is kept at the level of the high DC voltage, and the voltage applied to the low-voltage electrode plates is kept at the level of the dynamic convergence voltage. When the high DC voltage drops (or increases), the first and second diodes are rendered conductive, and when the high DC voltage increases (or drops), the voltages applied to the low- and high-voltage electrode plates increase (or drop) with the same time constant. Therefore, the voltage difference between the low- and high-voltage electrode plates varies little or becomes constant, so that no convergence error is produced. That is, when the high DC voltage applied to the high-voltage electrode plates varies, the voltage applied to the low-voltage electrode plates keeps up quickly with the voltage applied to the high-voltage electrode plates.

According to the present invention, there is also provided a dynamic convergence device in a color cathode-ray tube, comprising a color cathode-ray tube bulb, a pair of high-voltage electrode plates confronting each other disposed in the color cathode-ray tube bulb, a pair of low-voltage electrode plates disposed in the color cathode-ray tube bulb outwardly of the high-voltage electrode plates in confronting relationship thereto, the high- and low-voltage electrode plates being arranged such that a central electron beam will pass between the high-voltage electrode plates and side electron beams will pass between the high-voltage electrode plates and the low-voltage electrode plates, a high DC voltage source connected to the high-voltage electrode plates, a first parallel-connected circuit composed of a first resistor and a first diode which are connected between the high-voltage electrode plates and the low-voltage electrode plates, a second parallel-connected circuit composed of a second resistor and a second diode and having a terminal connected to the high-voltage electrode plates, a convergence voltage source for generating a convergence voltage which is composed of a vertical parabolic wave voltage added to a modulated voltage in horizontal blanking intervals thereof which is produced by amplitude-modulating a horizontal parabolic wave with a vertical parabolic wave, a first capacitor connected between the convergence voltage source and the low-voltage electrode plates, a second capacitor connected between the convergence voltage source and an opposite terminal of the second parallel-connected circuit, and a third capacitor connected between the low-voltage electrode plates and the opposite terminal of the parallel-connected circuit.

When the high DC voltage is constant, the voltage applied to the high-voltage electrode plates is kept at the level of the high DC voltage, and the voltage applied to the low-voltage electrode plates is kept at the level of the dynamic convergence voltage. When the high DC voltage increases, the second diode is rendered conductive. Since the capacitance of the third capacitor is large, the voltage applied to the low-voltage electrode plates increases with the high DC voltage. Therefore, the voltage difference between the low- and high-voltage electrode plates becomes constant, so that no convergence error is produced. When the high DC voltage decreases, since the first diode is rendered conductive, the voltage difference between the low- and high-voltage electrode plates becomes constant, so that no convergence error is produced. That is, when the high DC voltage applied to the high-voltage electrode plates varies, the voltage applied to the low-voltage electrode plates keeps up quickly with the voltage applied to the high-voltage electrode plates.

According to the present invention, there is further provided a dynamic convergence device in a color cathode-ray tube, comprising a color cathode-ray tube bulb, a pair of high-voltage electrode plates confronting each other disposed in the color cathode-ray tube bulb, a pair of low-voltage electrode plates disposed in the color cathode-ray tube bulb outwardly of the high-voltage electrode plates in confronting relationship thereto, the high- and low-voltage electrode plates being arranged such that a central electron beam will pass between the high-voltage electrode plates and side electron beams will pass between the high-voltage electrode plates and the low-voltage electrode plates, a high DC voltage source connected to the high-voltage electrode plates, a first parallel-connected circuit composed of a first resistor and a first diode and having a terminal connected to the low-voltage electrode plates, a second parallel-connected circuit composed of a second resistor and a second diode and having a terminal connected to the high-voltage electrode plates, a convergence voltage source for generating a convergence voltage which is composed of a vertical parabolic wave voltage added to a modulated voltage in horizontal blanking intervals thereof which is produced by amplitude-modulating a horizontal parabolic wave with a vertical parabolic wave, a first capacitor connected between the convergence voltage source and the low-voltage electrode plates, a clamp pulse power supply for generating a clamp pulse voltage having horizontal periods, a second capacitor connected between the clamp pulse power supply and opposite terminals of the first and second parallel-connected circuits, and a third diode connected between the high-voltage electrode plates and the low-voltage electrode plates.

When the high DC voltage is constant, the voltage applied to the high-voltage electrode plates is kept at the level of the high DC voltage, and the voltage applied to the low-voltage electrode plates is kept at the level of the dynamic convergence voltage. When the high DC voltage decreases, since the third diode is rendered conductive, the voltage difference between the low- and high-voltage electrode plates becomes constant, so that no convergence error is produced. Inasmuch as the time constant of the time-constant circuit composed of the second resistor and the second capacitor is somewhat smaller than the time constant of the time-constant circuit composed of the first resistor and the first capacitor, when the high DC voltage increases, the second capacitor is charged through the second resistor, allowing the voltage at the anodes of the first and second diodes to increase up to a certain level (which is slightly lower than the high DC voltage). Upon a further increase in the voltage at the anodes of the first and second diodes due to the arrival of the clamp pulse voltage, both the first and second diodes are rendered conductive, and the voltage difference between the low- and high-voltage electrode plates becomes constant, so that no convergence error is produced. That is, when the high DC voltage applied to the high-voltage electrode plates varies, the voltage applied to the low-voltage electrode plates keeps up quickly with the voltage applied to the high-voltage electrode plates.

According to the present invention, there is also provided a dynamic convergence device in a color cathode-ray tube, comprising a color cathode-ray tube bulb, a pair of high-voltage electrode plates confronting each other disposed in the color cathode-ray tube bulb, a pair of low-voltage electrode plates disposed in the color cathode-ray tube bulb outwardly of the high-voltage electrode plates in confronting relationship thereto, the high- and low-voltage electrode plates being arranged such that a central electron beam will pass between the high-voltage electrode plates and side electron beams will pass between the high-voltage electrode plates and the low-voltage electrode plates, a high DC voltage source connected to the high-voltage electrode plates, a first parallel-connected circuit composed of a first resistor and a first diode and having a terminal connected to the low-voltage electrode plates, a second parallel-connected circuit composed of a second resistor and a second diode and having a terminal connected to the high-voltage electrode plates, a third parallel-connected circuit composed of a third resistor and a third diode and having a terminal connected to the low-voltage electrode plates, a fourth parallel-connected circuit composed of a fourth resistor and a fourth diode and having a terminal connected to the high-voltage electrode plates, a convergence voltage source for generating a convergence voltage which is composed of a vertical parabolic wave voltage added to a modulated voltage in horizontal blanking intervals thereof which is produced by amplitude-modulating a horizontal parabolic wave with a vertical parabolic wave, a first capacitor connected between the convergence voltage source and the low-voltage electrode plates, a first clamp pulse power supply for generating a clamp pulse voltage having horizontal periods, a second capacitor connected between the first clamp pulse power supply and opposite terminals of the first and second parallel-connected circuits, a second clamp pulse power supply for generating a clamp pulse voltage having horizontal periods, and a third capacitor connected between the second clamp pulse power supply and opposite terminals of the third and fourth parallel-connected circuits.

When the high DC voltage is constant, the voltage applied to the high-voltage electrode plates is kept at the level of the high DC voltage, and the voltage applied to the low-voltage electrode plates is kept at the level of the dynamic convergence voltage. Because the time constant of the time-constant circuit composed of the second resistor and the second capacitor is somewhat smaller than the time constant of the time-constant circuit composed of the first resistor and the first capacitor, when the high DC voltage increases, the second capacitor is charged through the second resistor, allowing the voltage at the anodes of the first and second diodes to increase up to a certain level (which is slightly lower than the high DC voltage). Upon a further increase in the voltage at the anodes of the first and second diodes due to the arrival of the first clamp pulse voltage, both the first and second diodes are rendered conductive, and the voltage difference between the low- and high-voltage electrode plates becomes constant, so that no convergence error is produced. Inasmuch as the time constant of the time-constant circuit composed of the fourth resistor and the third capacitor is somewhat smaller than the time constant of the time-constant circuit composed of the first resistor and the first capacitor, when the high DC voltage decreases, the third capacitor is discharged through the second resistor, allowing the voltage at the anodes of the first and second diodes to increase up to a certain level (which is slightly lower than the high DC voltage). Upon a further decrease in the voltage at the cathodes of the third and fourth diodes due to the arrival of the second pulse voltage, both the third and fourth diodes are rendered conductive, and the voltage difference between the low- and high-voltage electrode plates becomes constant, so that no convergence error is produced. That is, when the high DC voltage applied to the high-voltage electrode plates varies, the voltage applied to the low-voltage electrode plates keeps up quickly with the voltage applied to the high-voltage electrode plates.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 4 is a fragmentary cross-sectional view of a dynamic convergence device according to a first prior example;

DETAILED DESCRIPTION OF THE PREFERRED EMBODIMENTS

FIGS. 10A, 10B, 11, and 12 illustrate a dynamic convergence device according to a first embodiment of the present invention. In the first embodiment, the principles of the present invention are incorporated in an in-line three-beam color cathode-ray tube (Trinitron color cathode-ray tube) with an aperture grille.

Figure 10A:
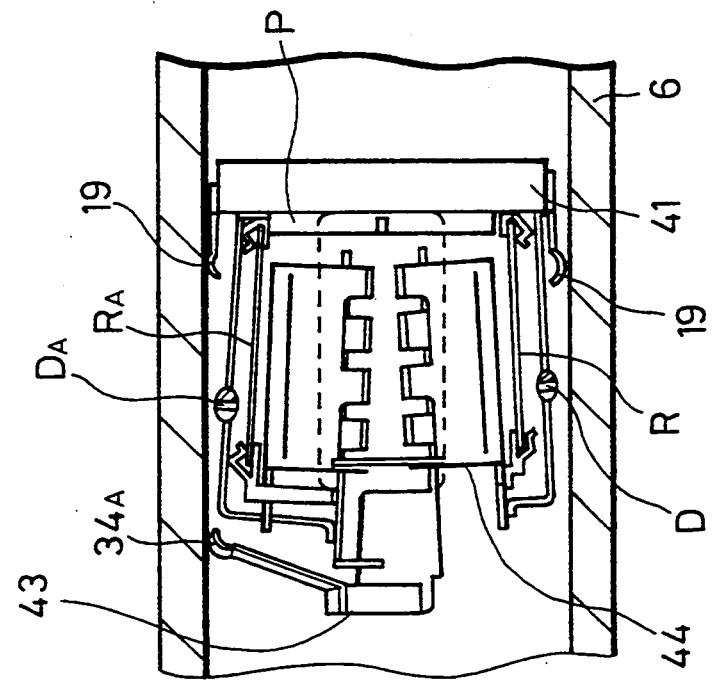
FIGS. 10A and 10B are fragmentary cross-sectional views of a dynamic convergence device according to a first embodiment of the present invention.
Figure 10B:
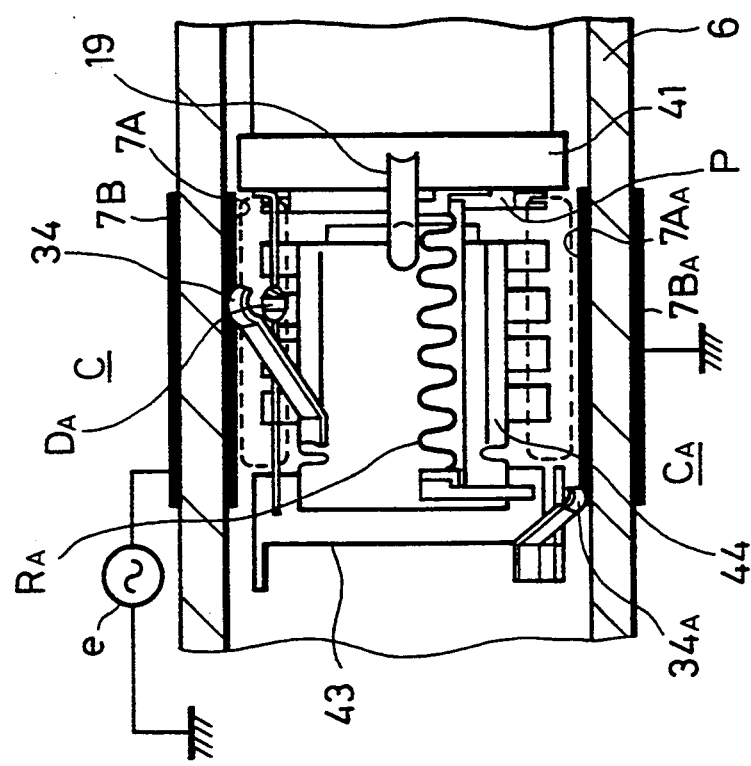

As shown in FIGS. 10A and 10B, a pair of convergence (C) shield electrodes (high-voltage electrode plates) 43 confronting each other and a pair of convergence (C) plate electrodes (low-voltage electrode plates) 44 disposed outwardly of the C shield electrodes 43 in confronting relationship to the C shield electrodes 43 are arranged horizontally in the bulb 6 of a color cathode-ray tube such that a central electron beam (green electron beam) passes between the C shield electrodes 43 and side electron beams (red and blue electron beams) pass between the C shield electrodes 43 and the C plate electrodes 44. These C shield and plate electrodes 43, 44 may be referred to as prism electrodes.

Figure 12:
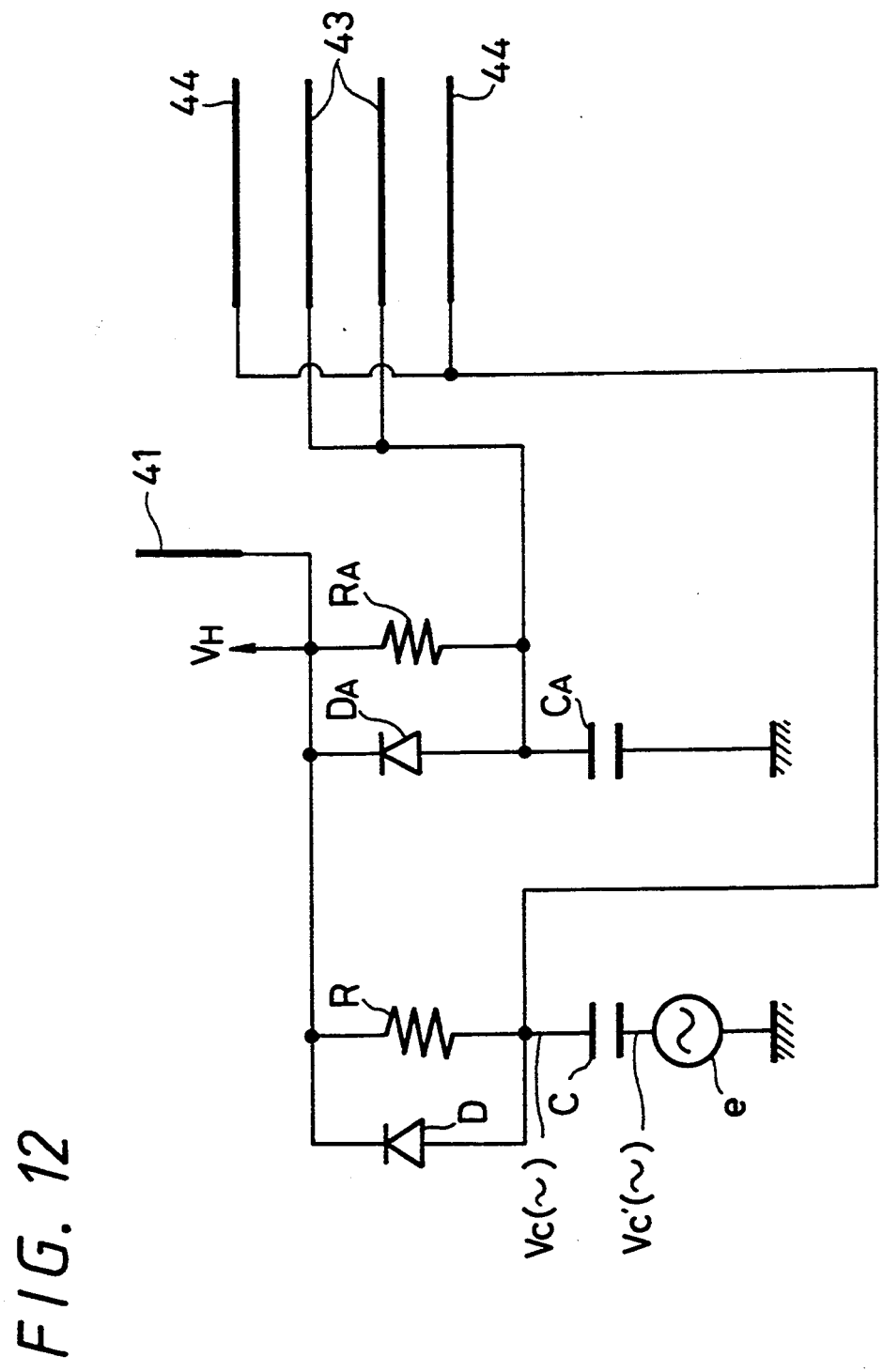
FIG. 12 is a circuit diagram showing an equivalent circuit of the dynamic convergence device according to the first embodiment.

As shown in FIG. 12, a high resistor (resistive body) R having a resistance of about several tens of MΩ (e.g., about 50 MΩ or less) and a diode D having a reverse breakdown voltage of about 1 kV or higher are connected parallel to each other. The diode D has a cathode connected to a high-voltage electrode (anode or the like) 41 to which a high DC voltage $V_H$ is applied, and an anode connected to the C plate electrodes 44. The high resistor R is welded to the C plate electrodes 44. The diode D is mounted on the C plate electrodes 44.

A high resistor (resistive body) $R_A$ having a resistance of about several tens of MΩ (e.g., about 50 MΩ or less) and a diode $D_A$ having a reverse breakdown voltage of about 1 kV or higher are connected parallel to each other. The diode $D_A$ has a cathode connected to the high-voltage electrode 41 and an anode connected to the C shield electrodes 43. The high resistor $R_A$ is welded to the C plate electrodes 44. The diode D is mounted on the C shield electrodes 43.

Figure 11:
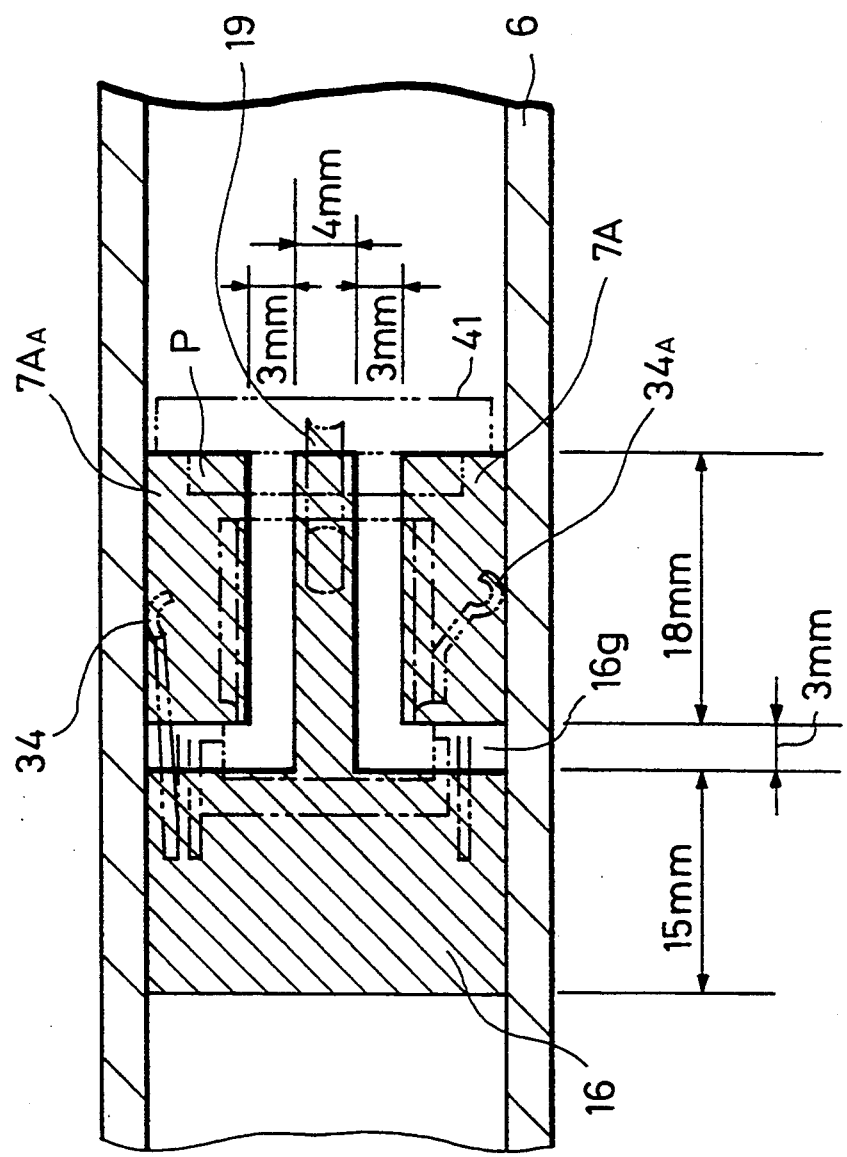
FIG. 11 is a fragmentary cross-sectional view of the dynamic convergence device according to the first embodiment shown in FIGS. 10A and 10B.

As shown in FIG. 11, an inner conductive layer (inner coated carbon layer) 16 is coated on the inner surface of the bulb 6 which extends from its funnel to its neck. A high DC voltage (anode voltage) $V_H$ of 30 kV, for example, is applied to the inner conductive layer 16. The high-voltage electrode 41 is connected to the inner conductive layer 16 through a spring (resilient conductive member) 19. The inner conductive layer 16 has insulating gaps 16g defined therein that separates portions thereof as inner conductive layers (inner coated carbon layers) 7A, $7A_A$ disposed in the neck of the bulb 6 and spaced from each other. As shown in FIG. 10A, outer conductive layers 7B, $7B_A$ (outer electrodes) are disposed on an outer surface of the bulb 6 in confronting relationship to the inner conductive layers 7A, $7A_A$, thus forming neck capacitors C, $C_A$ (cylindrical capacitors) with their dielectric medium composed of the portion of the bulb 6 between the inner and outer conductive layers 7A, $7A_A$, 7B, $7B_A$. Each of the neck capacitors C, $C_A$ has a capacitance of about 20 pF. The C plate electrodes 44 and the C shield electrodes 43 are connected through respective springs (resilient conductive layers) 34, $34_A$ to the inner conductive layers 7A, $7A_A$ of the neck capacitor C, $C_A$.

The C plate electrodes 44 and the C shield electrodes 43 are fixed by bead glass to a part P that is welded to the high-voltage electrode 41. Therefore, the convergence electrodes for effecting dynamic convergence are reliably secured in position to the electron gun itself. Because the C plate electrodes 44 and the C shield electrodes 43 are separate from each other, they are interconnected by ribbon cords. However, the C plate electrodes 44 and the C shield electrodes 43 may be integral with each other.

Figure 1:
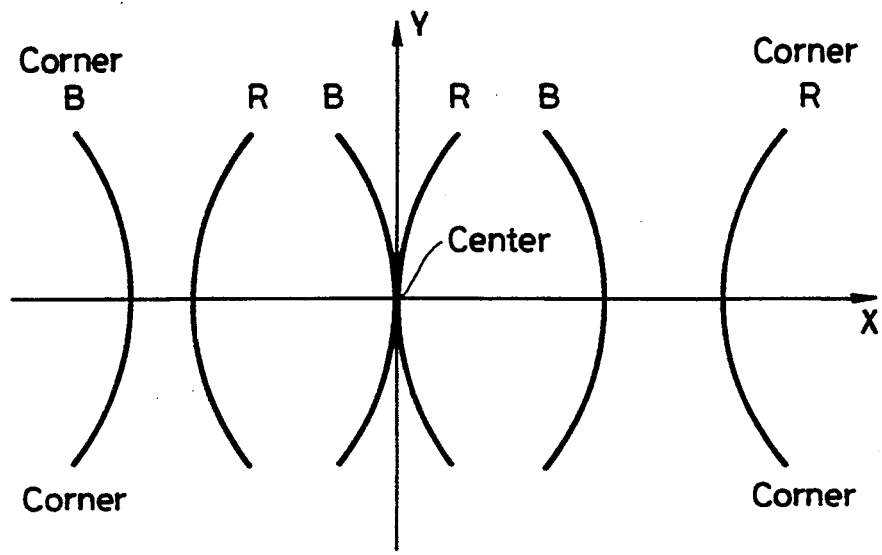
FIG. 1 is a diagram showing a convergence error.
Figure 3:
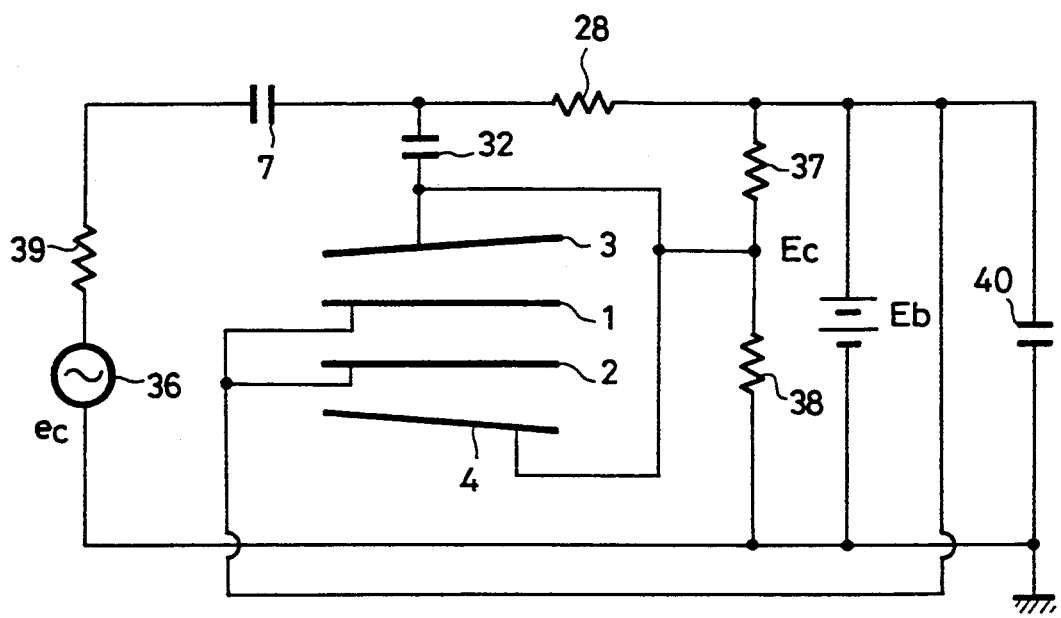
FIG. 3 is a circuit diagram showing an equivalent circuit of the dynamic convergence device shown in FIG. 2.
Figure 2:
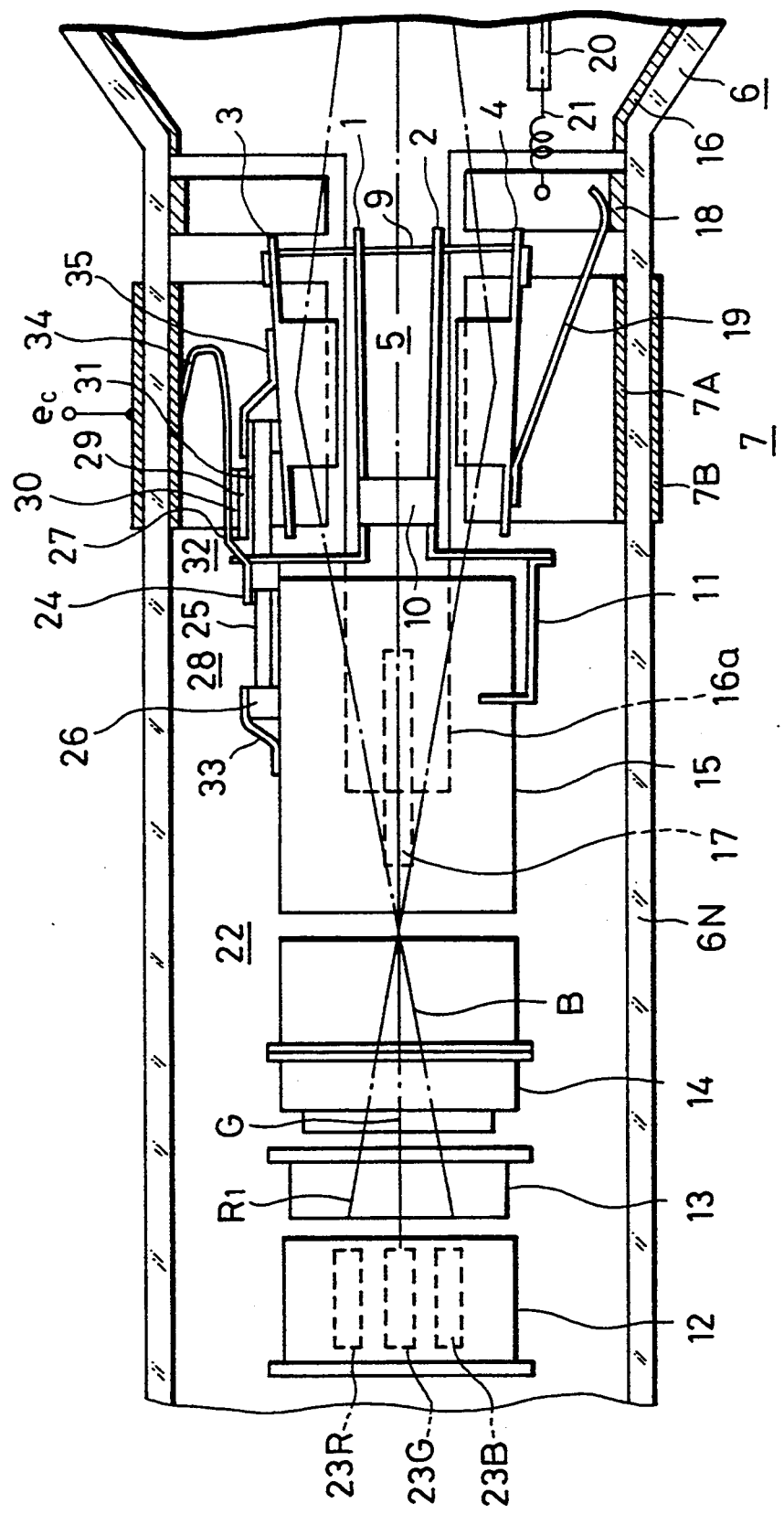
FIG. 2 is a fragmentary cross-sectional view of a color cathode-ray tube with a conventional dynamic convergence device.
Figure 5:
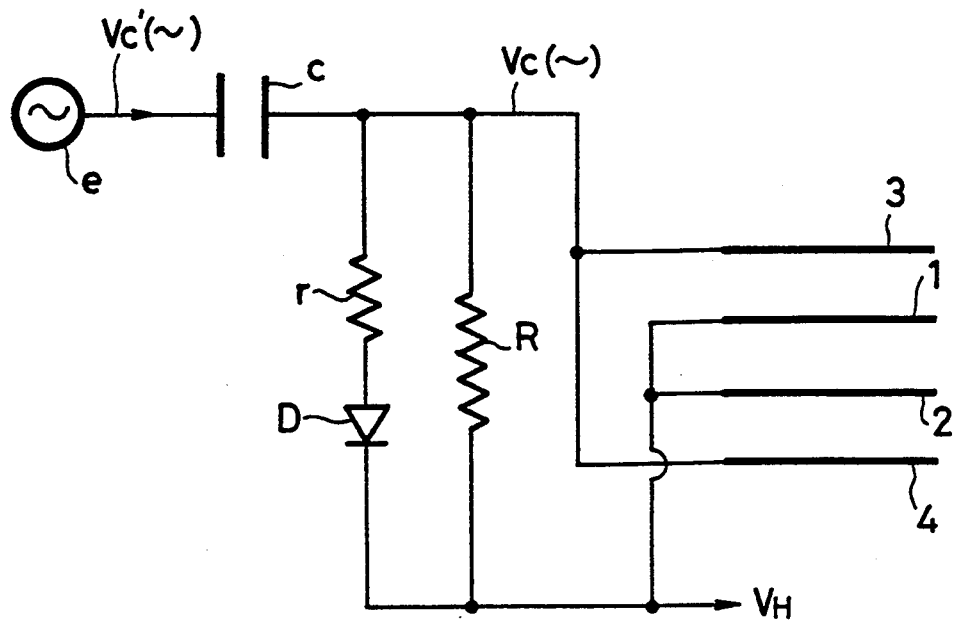
FIG. 5 is a circuit diagram showing an equivalent circuit of the dynamic convergence device according to the first prior example shown in FIG. 4.
Figure 7:
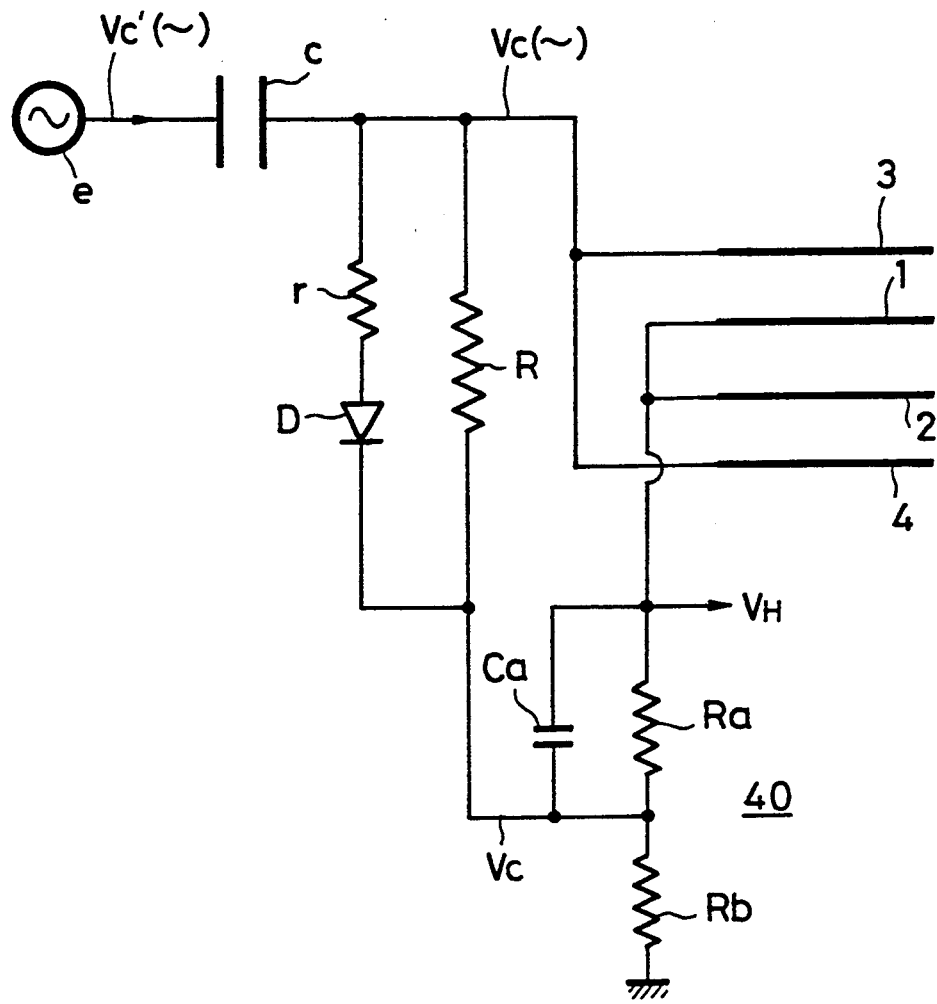
FIG. 7 is a circuit diagram showing an equivalent circuit of a dynamic convergence device according to a second prior example.
Figure 6A:
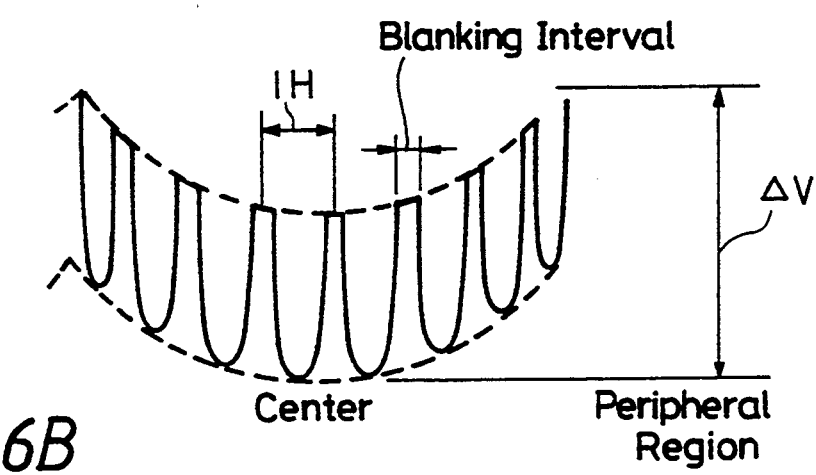
FIGS. 6A through 6D are diagrams illustrative of the manner in which the dynamic convergence device shown in FIG. 4 operates.
Figure 6B:
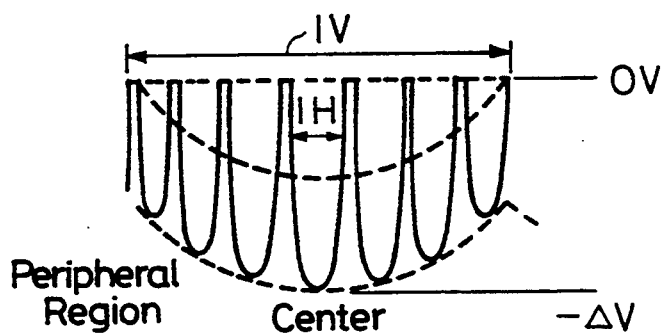
Figure 6C:
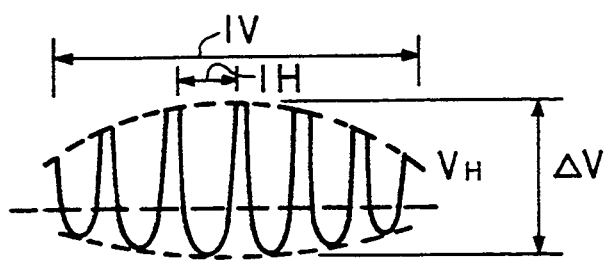
Figure 6D:
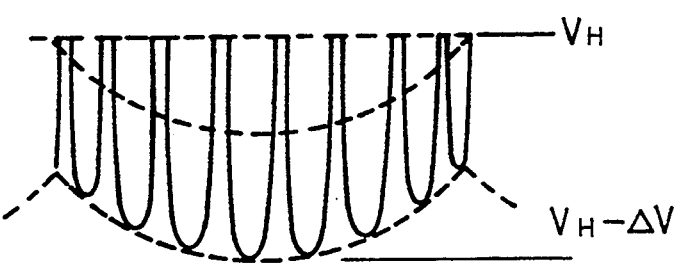
Figure 8A:
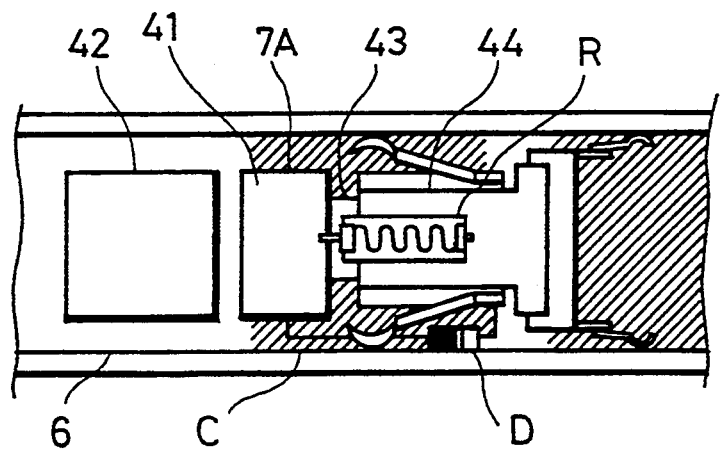
FIGS. 8A through 8C are fragmentary cross-sectional views of other conventional dynamic convergence devices and a dynamic convergence device according to a third prior example.
Figure 8B:
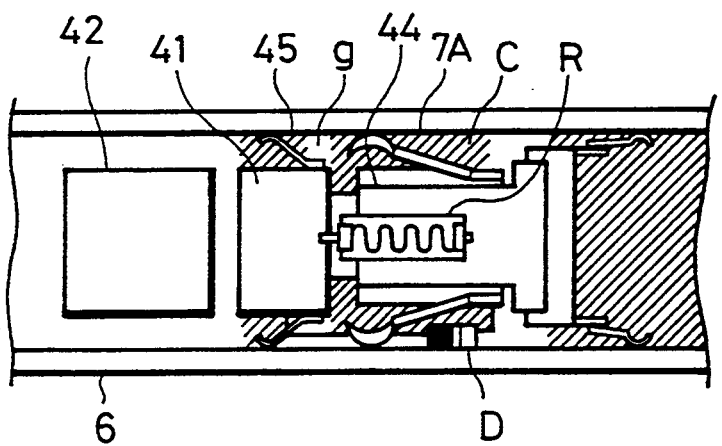
Figure 8C:
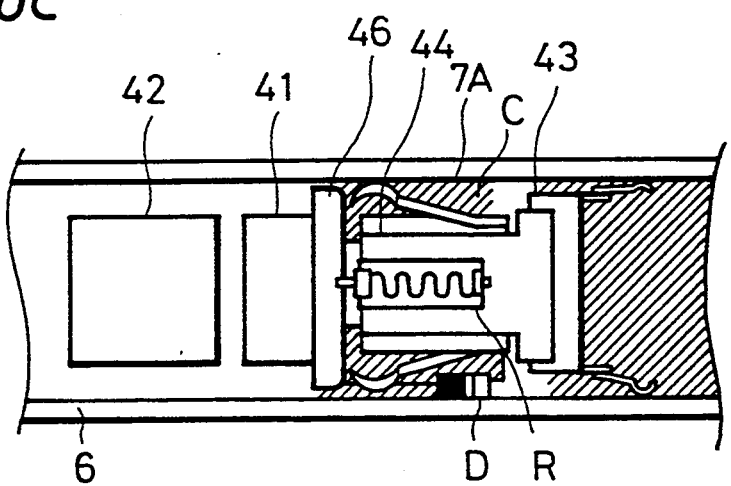
Figure 9A:
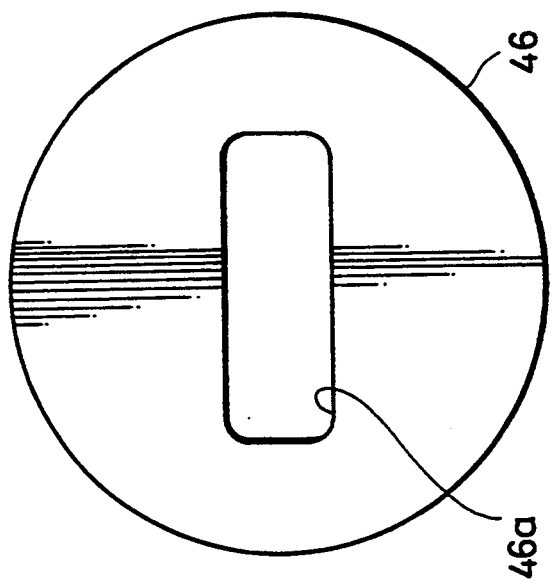
FIGS. 9A through 9D are plan, cross-sectional, bottom, and cross-sectional views, respectively, of a shield electrode in the dynamic convergence device according to the third prior example shown in FIG. 8C.
Figure 9B:
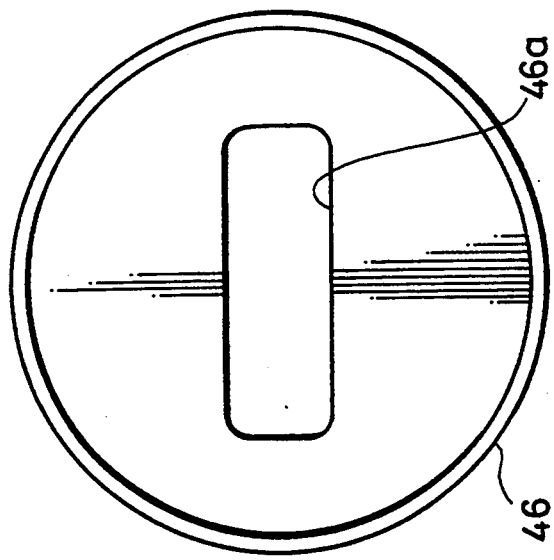
Figure 9C:
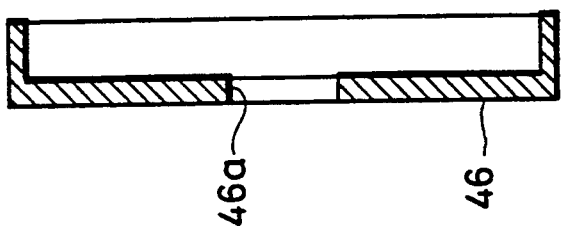
Figure 9D:
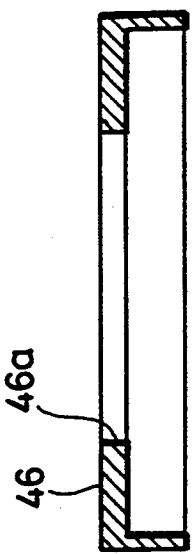

A convergence voltage Vc' (~) supplied from a power supply "e" is applied to the outer conductive layer 7B of the neck capacitor C, with the outer conductive layer $7B_A$ thereof being grounded. The convergence voltage Vc' (~) is a voltage produced by adding a vertical parabolic voltage to a modulated voltage in its horizontal blanking intervals which is produced by amplitude-modulating a horizontal parabolic wave shown in FIG. 6A with a vertical parabolic wave and which has an absolute amplitude of $\Delta V$ (e.g., 1 kV), the convergence voltage Vc' (~) having a level varying between 0 V and $-\Delta V$ as shown in FIG. 6B. If it were not for the diode D, then the voltage applied to the C plate electrodes 44 would be of an AC-clamped waveform as shown in FIG. 6C, i.e., the vertical-frequency component would not accurately be transmitted. With the diode D connected parallel to the high resistor R such that the cathode thereof is connected to the C shield electrodes 43, a convergence voltage Vc (~) applied to the C plate electrodes 44 is suppressed below the high DC voltage $V_H$ by the diode D, and has a negative level varying from $V_H$ to $V_H - \Delta V$, as shown in FIG. 6D, allowing the vertical-frequency component to be transmitted reliably. The convergence voltage Vc' (~) applied to the capacitor C may be of an AC-clamped voltage as shown in FIG. 6C. In this case, voltage having the waveform shown in FIG. 6D is also applied to the C plate electrodes 44.

The diodes D, $D_A$ have equal characteristics, the high resistors R, $R_A$ have equal resistances, and the neck capacitors C, $C_A$ have equal capacitances.

When the high DC voltage $V_H$ is constant, the neck capacitors C, $C_A$ are charged. Therefore, the voltage applied to the C shield electrodes 43 is kept at the level of the high DC voltage $V_H$, and the voltage applied to the C plate electrodes 44 is kept at the level of the dynamic convergence voltage. When the high DC voltage $V_H$ drops, since the diodes D, $D_A$ are rendered conductive, the voltage difference between the C plate electrodes 44 and the C shield electrodes 43 becomes constant, so that no convergence error is produced. When the high DC voltage $V_H$ increases, since the neck capacitors C, $C_A$ are charged through the high resistors R, $R_A$ with the same time constant, the voltages applied to the C plate electrodes 44 and the C shield electrodes 43 increase with the same time constant, and the voltage difference between the C plate electrodes 44 and the C shield electrodes 43 becomes constant, so that no convergence error is produced. That is, when the high DC voltage $V_H$ applied to the C shield electrodes 43 varies, the voltage applied to the C plate electrodes 44 keeps up quickly with the voltage applied to the C shield electrodes 43.

Since this dynamic convergence device can achieve reliable dynamic convergence, the magnetic field generated by the deflection yoke may be a uniform magnetic field, thereby preventing the electron beam spots from being defocused in the peripheral region of the screen of the color cathode-ray tube.

Figure 13:
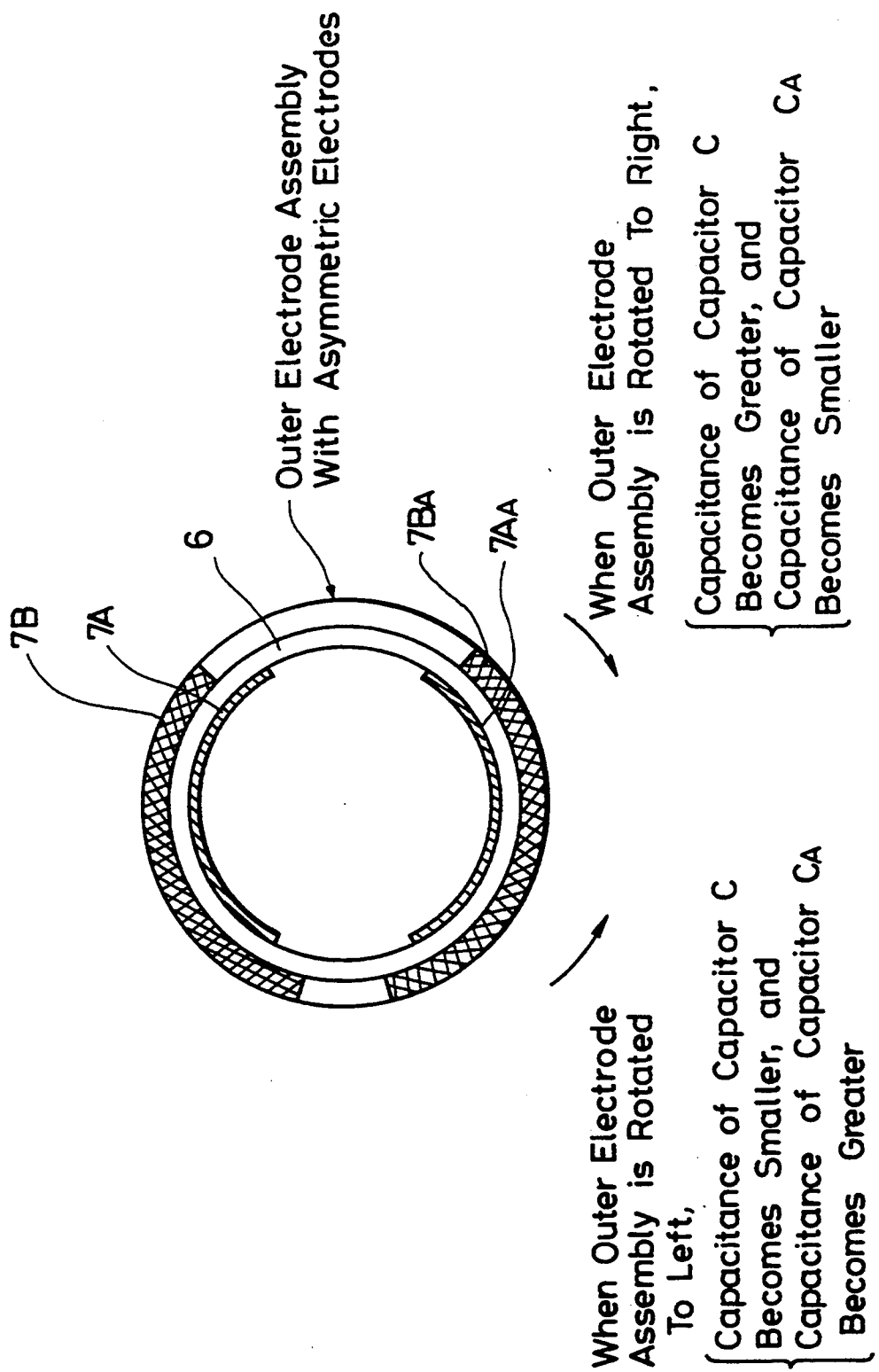
FIG. 13 is a cross-sectional view illustrative of how neck convergence is adjusted.

As described above, the time constants of the time-constant circuits which are composed of the neck capacitors C, $C_A$ and the high resistors (high resistive bodies) R, $R_A$ are equal to each other. These time constants can be equalized when the capacitances of the neck capacitors C, $C_A$ are adjusted by varying the surface areas of the outer conductive layers 7B, $7B_A$ of the respective neck capacitors C, $C_A$. Such capacitance adjustment of the neck capacitors C, $C_A$ will be described below with reference to FIG. 13. As shown in FIG. 13, the outer conductive layers 7B, $7B_A$ are positioned asymmetrically with respect to the axis of the bulb 6, and jointly make up an outer electrode assembly which can be rotated on the bulb 6. When the outer electrode assembly is rotated in one direction around the bulb 6, one of the capacitances of the neck capacitors C, $C_A$ connected respectively to the C plate and shield electrodes 44, 43 can be increased and the other capacitance can be reduced, and when the outer electrode assembly is rotated in the opposite direction around the bulb 6, the one capacitance can be reduced and the other capacitance can be increased. Therefore, the capacitances of the neck capacitors C, $C_A$ can be varied complementarily depending on the direction in which the outer electrode assembly is rotated.

Instead of directly adjusting the capacitances of the neck capacitors C, $C_A$, external capacitors may be connected to the neck capacitors C, $C_A$ through leads for indirectly adjusting the capacitances of the neck capacitors C, $C_A$.

Figure 14:
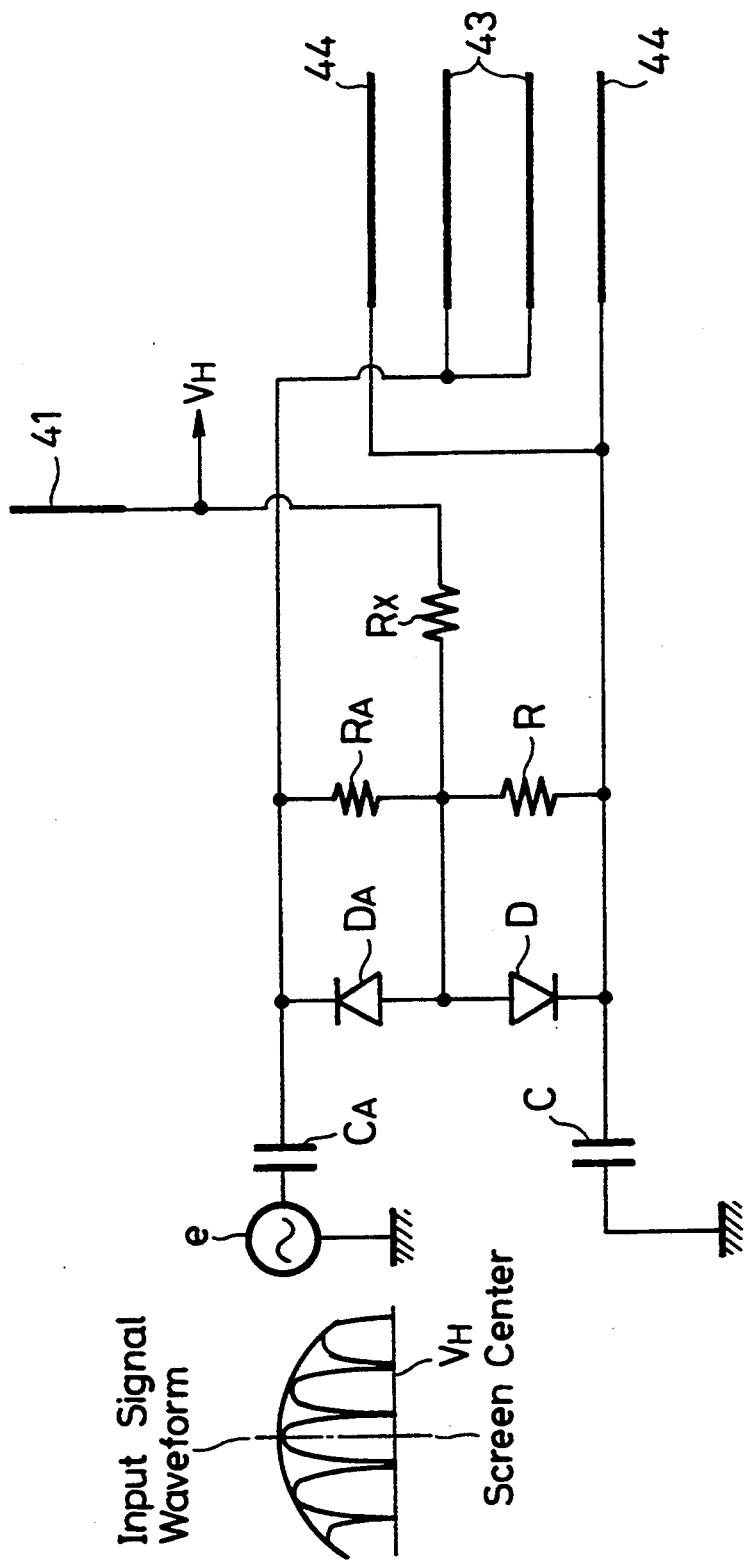
FIG. 14 is a circuit diagram showing an equivalent circuit of a dynamic convergence device according to a second embodiment of the present invention.

An equivalent circuit of a dynamic convergence device according to a second embodiment of the present invention will be described below with reference to FIG. 14. Those parts shown in FIG. 14 which are identical to those in the first embodiment shown in FIG. 12 are denoted by identical reference characters, and will not be described in detail below. As shown in FIG. 14, diodes D, $D_A$ have respective anodes connected to each other, and the junction between the anodes of the diodes D, $D_A$ is connected through a resistor (resistive body), e.g., PCE, $R_X$ to a high-voltage electrode 41. The resistor $R_X$ serves to block an abrupt large current which flows upon knocking in a process of manufacturing the color cathode-ray tube. A high DC voltage $V_H$ is applied to the high-voltage electrode 41.

High resistors R, $R_A$ are connected parallel to the diodes D, $D_A$, respectively. The diode D has a cathode connected to a pair of C plate electrodes 44, and the diode $D_A$ has a cathode connected to a pair of C shield electrodes 43. The C plate electrodes 44 are grounded through a neck capacitor C. A convergence voltage, which is in opposite phase to the convergence voltage shown in FIG. 6B, is applied from a power supply "e" through a neck capacitor $C_A$ to the C shield electrodes 43. The convergence voltage applied to the C shield electrodes 43 is a voltage, which is in opposite phase to the convergence voltage shown in FIG. 6D, higher than the high DC voltage $V_H$ whose waveform is shown in FIG. 14.

The diodes D, $D_A$ have equal characteristics, the high resistors R, $R_A$ have equal resistances, and the neck capacitors C, $C_A$ have equal capacitances.

When the high DC voltage $V_H$ is constant, the neck capacitors C, $C_A$ are charged. Therefore, the voltage applied to the C shield electrodes 43 is kept at the level of the dynamic convergence voltage, and the voltage applied to the C plate electrodes 44 is kept at the level of the high DC voltage $V_H$. When the high DC voltage $V_H$ increases, since the diodes D, $D_A$ are rendered conductive, the voltage difference between the C plate electrodes 44 and the C shield electrodes 43 becomes constant, so that no convergence error is produced. When the high DC voltage $V_H$ decreases, since the neck capacitors C, $C_A$ are discharged through the high resistors R, $R_A$ with the same time constant, the voltages applied to the C plate electrodes 44 and the C shield electrodes 43 drop with the same time constant, and the voltage difference between the C plate electrodes 44 and the C shield electrodes 43 becomes constant, so that no convergence error is produced. That is, when the high DC voltage $V_H$ applied to the C shield electrodes 43 varies, the voltage applied to the C plate electrodes 44 keeps up quickly with the voltage applied to the C shield electrodes 43.

Figure 15:
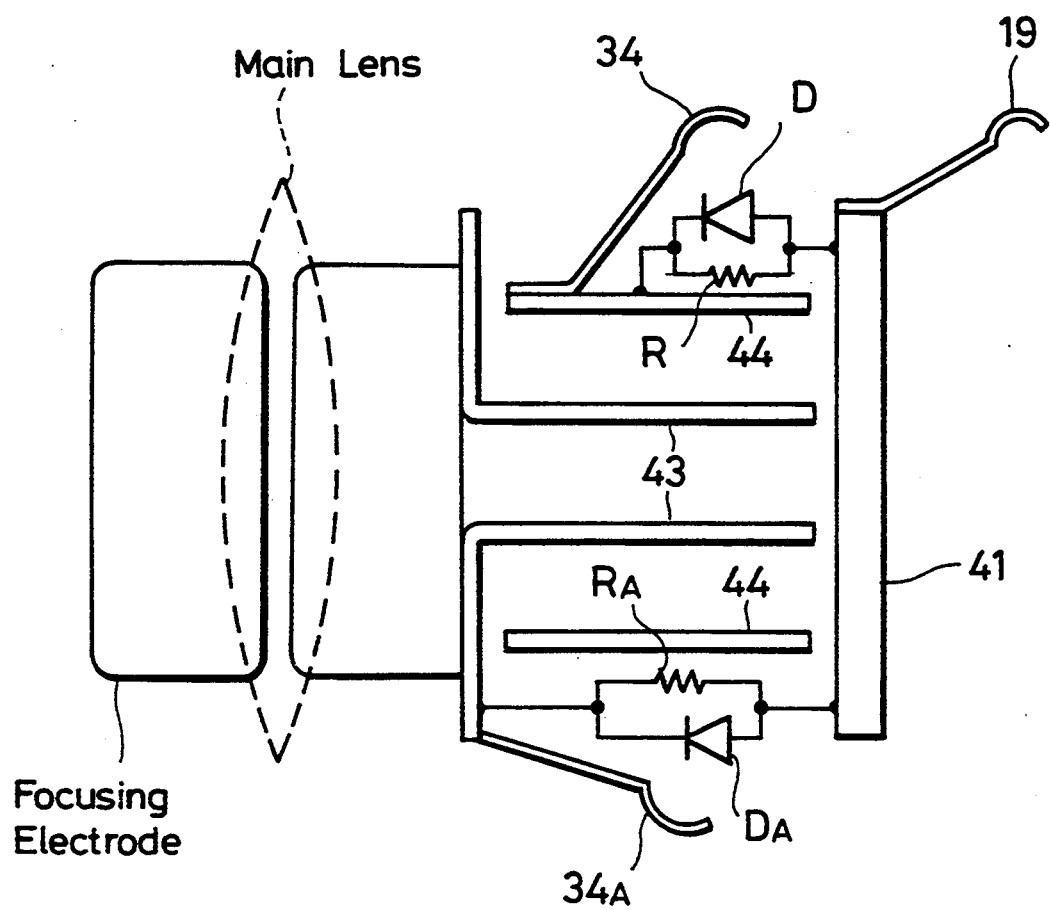
FIG. 15 is a view showing a portion of the dynamic convergence device according to the second embodiment shown in FIG. 14.

As shown in FIG. 15, a main electronic lens is formed when the C shield electrodes 43 and focusing electrodes positioned adjacent thereto are held at the same potential. The main electronic lens thus produced can effect dynamic focusing for adjusting the electron beam spots at the center and corners of the screen of the color cathode-ray tube.

Figure 16A:
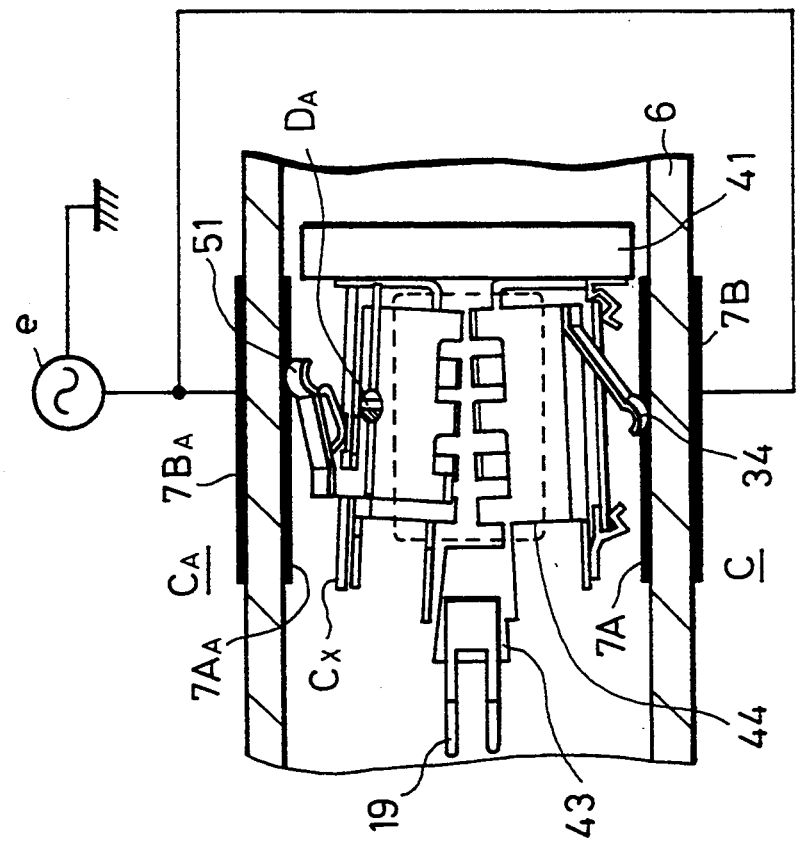
FIGS. 16A and 16B are fragmentary cross-sectional views of a dynamic convergence device according to a third embodiment of the present invention.
Figure 16B:
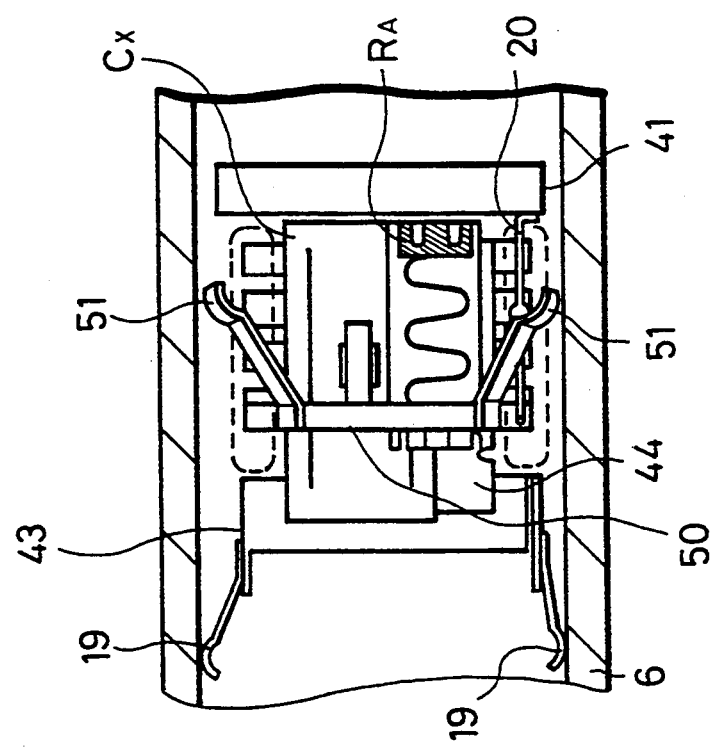
Figure 17:
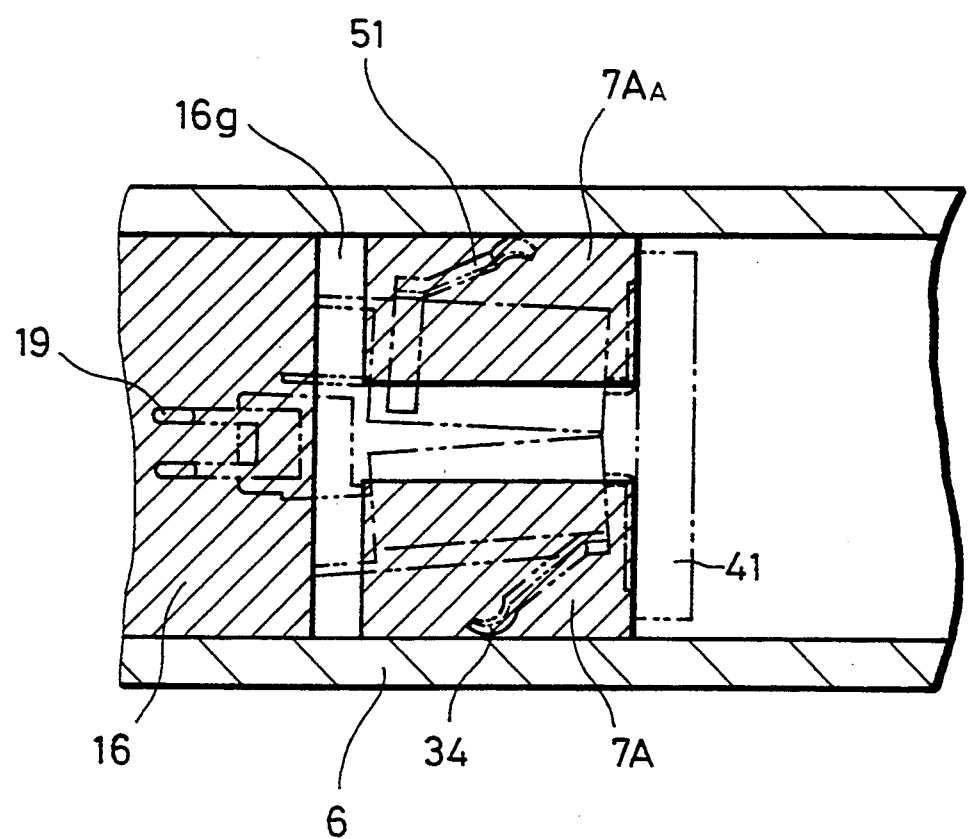
FIG. 17 is a fragmentary cross-sectional view of the dynamic convergence device according to the third embodiment shown in FIGS. 16A and 16B.
Figure 18:
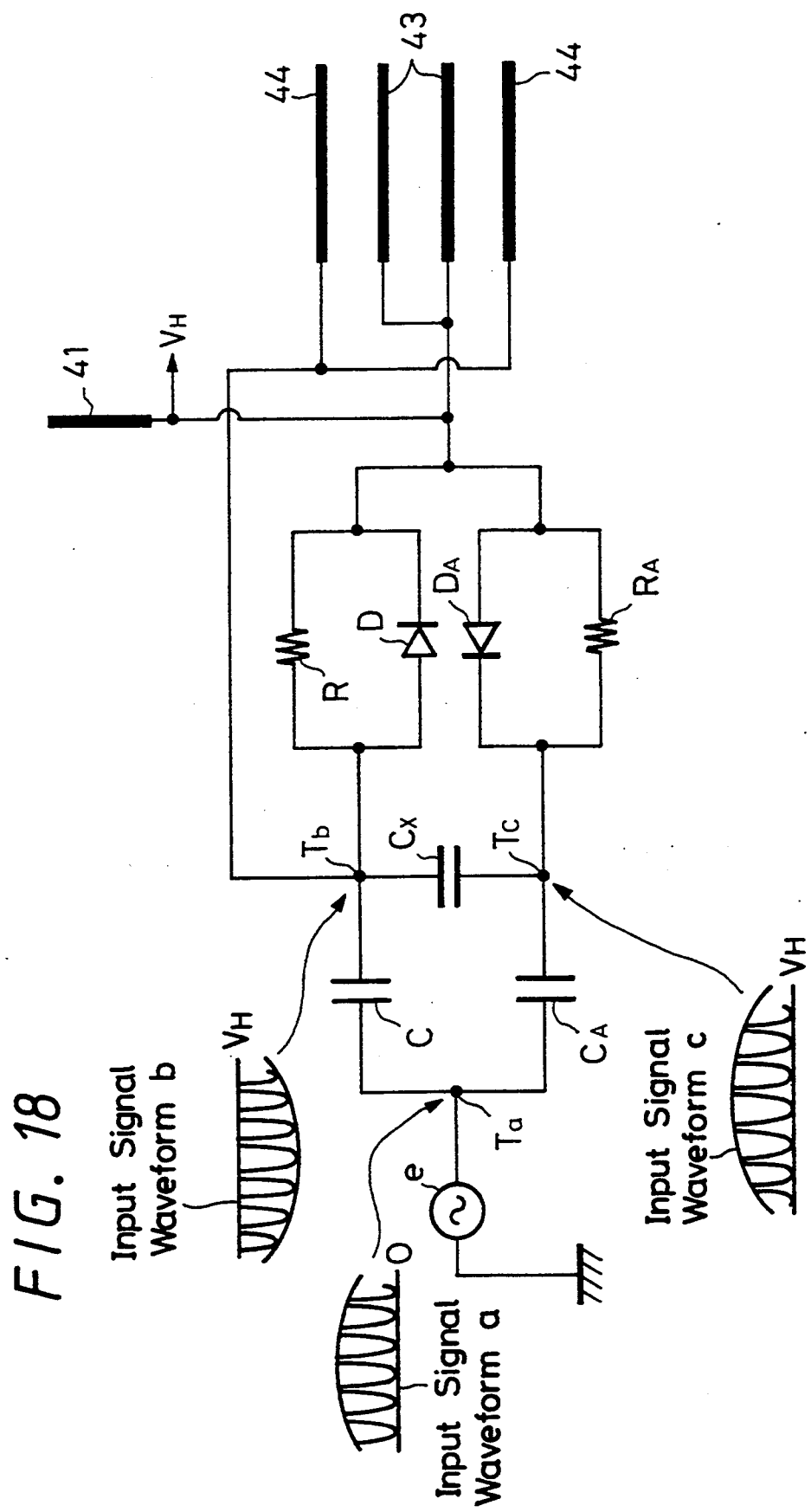
FIG. 18 is a circuit diagram showing an equivalent circuit of the dynamic convergence device according to the third embodiment.

FIGS. 16A, 16B, 17, and 18 show a dynamic convergence device according to a third embodiment of the present invention. First, an equivalent circuit of the dynamic convergence device according to the third embodiment will be described below with reference to FIG. 18. As shown in FIG. 18, diodes D, $D_A$ have a cathode and an anode, respectively, which are connected to each other, and the junction therebetween is connected to a high-voltage electrode 41 and a pair of C shield electrodes 43. A high DC voltage $V_H$ is applied to the high-voltage electrode 41 and the shield electrodes 43. High resistors R, $R_A$ are connected parallel to the diodes D, $D_A$, respectively. The diode D has an anode connected to a pair of C plate electrodes 44. A power supply "e" for supplying a convergence voltage is connected through neck capacitors C, $C_A$ respectively to the anode of the diode D and the cathode of the diode $D_A$. A built-in capacitor $C_X$ having a capacitance of 500 pF and a dielectric strength of 1 kV is connected between the anode of the diode D and the cathode of the diode $D_A$.

The convergence voltage at a junction Ta between the neck capacitors C, $C_A$ has an input waveform "a" which varies between 0 V and a positive voltage. The convergence voltage at a junction Tb connected to the anode of the diode D has an input waveform "b" which is of a voltage equal to the input waveform "a" clamped to the high DC voltage $V_H$. The convergence voltage at a junction Tc connected to the cathode of the diode $D_A$ has an input waveform "c" which is of a voltage equal to the sum of the high DC voltage $V_H$ and the input waveform "a". The built-in capacitor $C_X$ can be charged by a voltage which is equal to the difference between the voltages at the junctions Tb, Tc.

The structure of the dynamic convergence device according to the third embodiment will be described below with reference to FIGS. 16A, 16B, and 17. The built-in capacitor $C_X$ is connected between a floating electrode 50 and the C plate electrodes 44. The parallel-connected circuit of the high resistor $R_A$ and the diode $D_A$ is connected between the floating electrode 50, and the high-voltage electrode 41 and the C shield electrodes 43. The floating electrode 50 is supplied with the convergence voltage with the input waveform "a" at the junction Ta from the neck capacitor $C_A$ through a spring (resilient conductive body) 34.

An inner conductive layer (inner coated carbon layer) 16 is coated on the inner surface of the bulb 6 which extends from its funnel to its neck. A high DC voltage (anode voltage) $V_H$ of 30 kV, for example, is applied to the inner conductive layer 16. The high-voltage electrode 41 is connected to the inner conductive layer 16 through a spring (resilient conductive member) 19. The inner conductive layer 16 has insulating gaps 16g defined therein that separates portions thereof as inner conductive layers (inner coated carbon layers) 7A, 7$A_A$ disposed in the neck of the bulb 6 and spaced from each other. As shown in FIG. 16B, outer conductive layers 7B, 7$B_A$ (outer electrodes) are disposed on an outer surface of the bulb 6 in confronting relationship to the inner conductive layers 7A, 7$A_A$, thus forming neck capacitors C, $C_A$ (cylindrical capacitors) with their dielectric medium composed of the portion of the bulb 6 between the inner and outer conductive layers 7A, 7$A_A$, 7B, 7$B_A$. Each of the neck capacitors C, $C_A$ has a capacitance of about 20 pF. The C plate electrodes 44 and the C shield electrodes 43 are connected through respective springs (resilient conductive layers) 34, 51 to the inner conductive layers 7A, 7$A_A$ of the neck capacitor C, $C_A$.

The diodes D, $D_A$ have equal characteristics, the high resistors R, $R_A$ have equal resistances, and the built-in capacitor $C_X$ has a capacitance which is sufficiently larger than the capacitances of the neck capacitors C, $C_A$.

The built-in capacitor $C_X$ is charged to the voltage which is equal to the difference between the convergence voltages having the respective input waveforms "b", "c" at the opposite ends Tb, Tc of the built-in capacitor $C_X$. When the high DC voltage $V_H$ is constant, the voltage applied to the C shield electrodes 43 is kept at the level of the high DC voltage $V_H$, and the voltage applied to the C plate electrodes 44 is kept at the level of the dynamic convergence voltage. When the high DC voltage $V_H$ increases, the diode $D_A$ is rendered conductive. Since the capacitance of the built-in capacitor $C_X$ is large, the voltage applied to the C plate electrodes 44 rises with the high DC voltage $V_H$. Therefore, the voltage difference between the C plate electrodes 44 and the C shield electrodes 43 becomes constant, so that no convergence error is produced. When the high DC voltage $V_H$ decreases, since the diode D is rendered conductive, the voltage difference between the C plate electrodes 44 and the C shield electrodes 43 becomes constant, so that no convergence error is produced.

Figure 19:
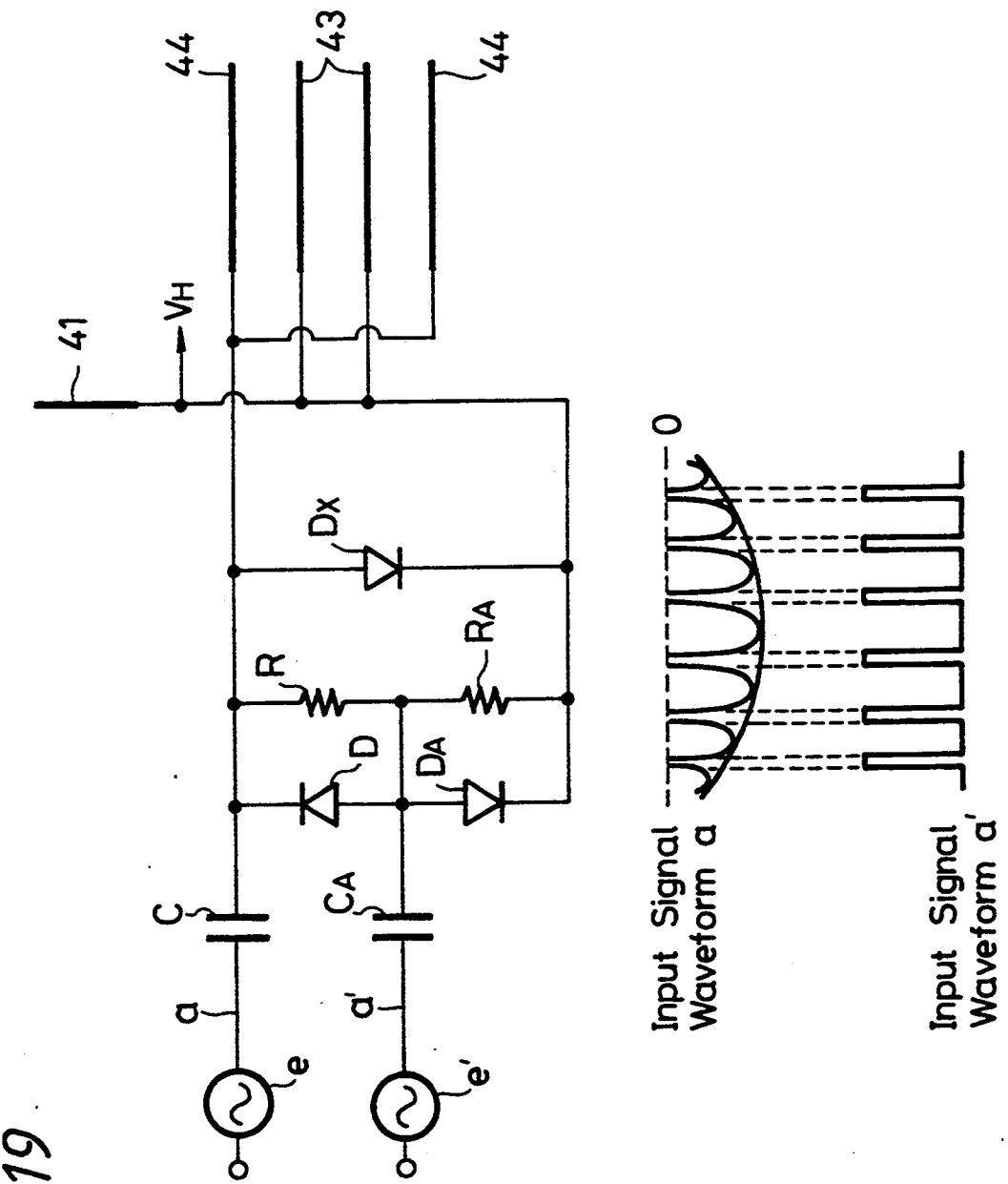
FIG. 19 is a circuit diagram showing an equivalent circuit of a dynamic convergence device according to a fourth embodiment of the present invention.

An equivalent circuit of a dynamic convergence device according to a fourth embodiment of the present invention will be described below with reference to FIG. 19. The dynamic convergence device according to the fourth embodiment is of the dynamic clamp type. The cathode of a diode D is connected to a pair of C plate electrodes 44, and the cathode of a diode $D_A$ is connected to a high-voltage electrode 41 to which a high DC voltage $V_H$ is applied and a pair of C shield electrodes 43. High resistors R, $R_A$ are connected parallel to the diodes D, $D_A$, respectively. A diode $D_X$ has an anode connected to the C plate electrodes 44 and a cathode connected to the high-voltage electrode 41 and the C plate electrodes 44. A convergence voltage having an input waveform "a" (see FIG. 6B) is applied from a power supply "e" to the outer conductive layer of a neck capacitor C whose inner conductive layer is connected to the C plate electrodes 44. A clamp pulse voltage (a pulse voltage that is synchronous with the horizontal signal of the deflection circuit of the color cathode-ray tube) having an input waveform "a'" is applied from a power supply "e'" to the outer conductive layer of a neck capacitor $C_A$ whose inner conductive layer is connected to the junction between the anodes of the diodes D, $D_A$. The neck capacitor C has a capacitance of about 30 pF or lower, and the neck capacitor $C_A$ has a capacitance of about 5 pF or lower, which is selected to be smaller than the capacitance of the neck capacitor C.

The diodes D, $D_A$ have equal characteristics, the high resistors R, $R_A$ have equal resistances, and the capacitance of the neck capacitor C is smaller than the capacitance of the neck capacitor $C_A$.

When the high DC voltage $V_H$ is constant, the voltage applied to the C shield electrodes 43 is kept at the level of the high DC voltage $V_H$, and the voltage applied to the C plate electrodes 44 is kept at the level of the dynamic convergence voltage. When the high DC voltage $V_H$ decreases, since the diode $D_X$ is rendered conductive, the voltage difference between the C plate electrodes 44 and the C shield electrodes 43 becomes constant, so that no convergence error is produced. Inasmuch as the time constant of the time-constant circuit composed of the high resistor $R_A$ and the neck capacitor $C_A$ is somewhat smaller than the time constant of the time-constant circuit composed of the high resistor R and the neck capacitor C, when the high DC voltage $V_H$ increases, the neck capacitor $C_A$ is charged through the resistor $R_A$, allowing the voltage at the anodes of the diodes D, $D_A$ to increase up to a certain level (which is slightly lower than the high DC voltage $V_H$). Upon a further increase in the voltage at the anodes of the diodes D, $D_A$ due to the arrival of the clamp pulse voltage from the power supply "e'", both the diodes D, $D_A$ are rendered conductive, and the voltage difference between the C plate electrodes 44 and the C shield electrodes 43 becomes constant, so that no convergence error is produced. That is, when the high DC voltage $V_H$ applied to the C shield electrodes 43 varies, the voltage applied to the C plate electrodes 44 keeps up quickly with the voltage applied to the C shield electrodes 43.

Figure 20:
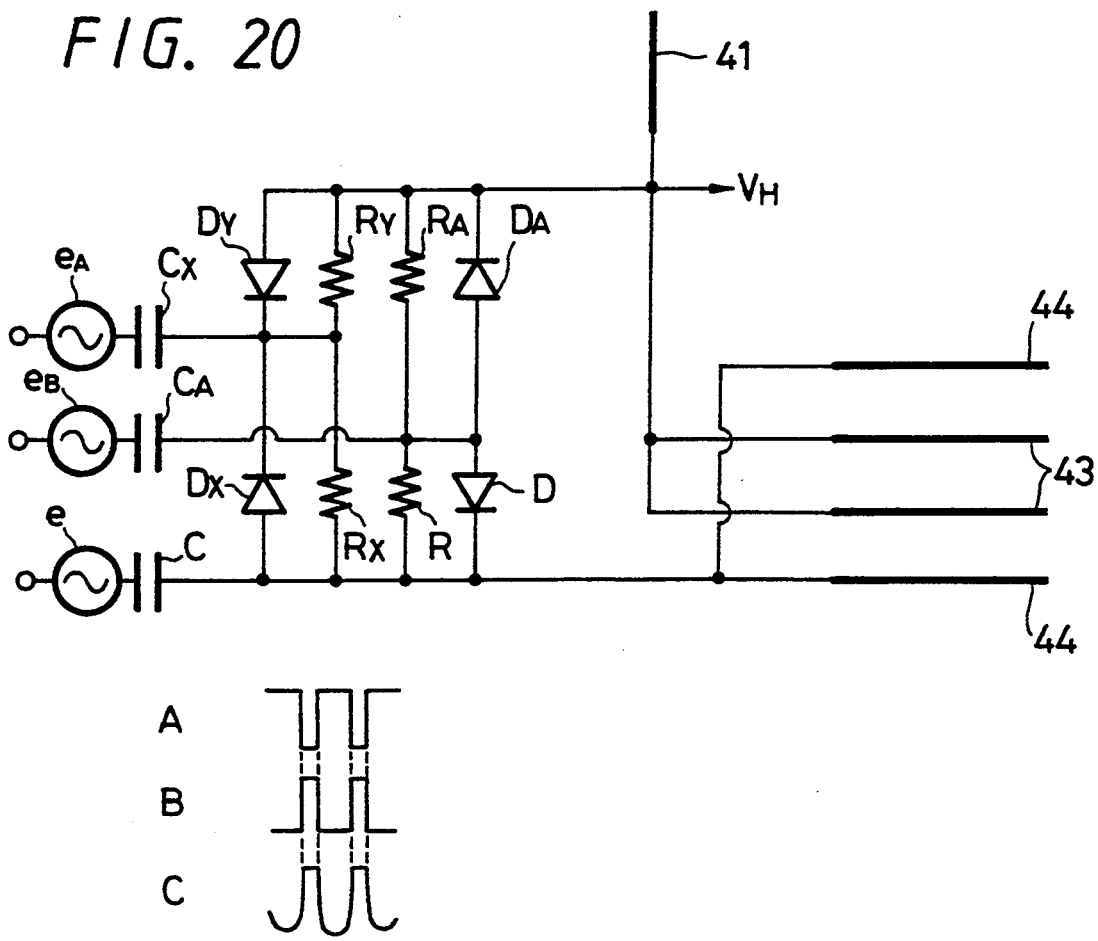
FIG. 20 is a circuit diagram showing an equivalent circuit of a dynamic convergence device according to a fifth embodiment of the present invention.

An equivalent circuit of a dynamic convergence device according to a fifth embodiment of the present invention will be described below with reference to FIG. 20. The dynamic convergence device according to the fifth embodiment is of the dynamic clamp type in which analog switching is carried out using a diode bridge. The cathode of a diode D is connected to a pair of C plate electrodes 44, and the cathode of a diode $D_A$ is connected to a high-voltage electrode 41 to which a high DC voltage $V_H$ is applied and a pair of C shield electrodes 43. The dynamic convergence device also has diodes $D_X$, $D_Y$ having a high reverse breakdown voltage, similar to the diodes D, $D_A$. The anode of the diode $D_X$ is connected to the C plate electrodes 44, and the anode of the diode $D_Y$ is connected to the high-voltage electrode 41 and the C shield electrodes 43. High resistors R, $R_A$, $R_X$, $R_Y$ are connected parallel to the diodes D, $D_A$, $D_X$, $D_Y$, respectively.

A dynamic convergence voltage having an input waveform "C" is applied from a power supply "e" to the outer conductive layer of a neck capacitor C whose inner conductive layer is connected to the C plate electrodes 44. Complementary clamp pulse voltages (a pulse voltage that is synchronous with the horizontal signal of the deflection circuit of the color cathode-ray tube) having respective input waveforms "A", "B" are applied from power supplies "$e_A$", "$e_B$" to the outer conductive layers, respectively, of neck capacitor $C_X$, $C_A$ whose inner conductive layers are connected respectively to the junction between the cathodes of the diodes $D_X$, $D_Y$, and the junction between the anodes of the diodes D, $D_A$.

The diodes D, $D_A$, $D_X$, $D_Y$ have equal characteristics, the high resistors R, $R_A$, $R_X$, $R_Y$ have equal resistances, and the capacitances of the neck capacitors $C_A$, $C_X$ are substantially equal to each other and somewhat smaller than the capacitance of the neck capacitor C.

When the high DC voltage $V_H$ is constant, the voltage applied to the C shield electrodes 43 is kept at the level of the high DC voltage $V_H$, and the voltage applied to the C plate electrodes 44 is kept at the level of the dynamic convergence voltage. Since the time constant of the time-constant circuit composed of the high resistor $R_A$ and the neck capacitor $C_A$ is somewhat smaller than the time constant of the time-constant circuit composed of the high resistor R and the neck capacitor C, when the high DC voltage $V_H$ increases, the neck capacitor $C_A$ is charged through the resistor $R_A$, allowing the voltage at the anodes of the diodes D, $D_A$ to increase up to a certain level (which is slightly lower than the high DC voltage $V_H$). Upon a further increase in the voltage at the anodes of the diodes D, $D_A$ due to the arrival of a first clamp pulse voltage B from the power supply "$e_B$", both the diodes D, $D_A$ are rendered conductive, and the voltage difference between the C plate electrodes 44 and the C shield electrodes 43 becomes constant, so that no convergence error is produced. Inasmuch as the time constant of the time-constant circuit composed of the high resistor $R_Y$ and the neck capacitor $C_X$ is somewhat smaller than the time constant of the time-constant circuit composed of the high resistor R and the neck capacitor C, when the high DC voltage $V_H$ drops, the neck capacitor $C_X$ is discharged through the resistor $R_A$, allowing the voltage at the anodes of the diodes D, $D_A$ to decrease down to a certain level (which is slightly lower than the high DC voltage $V_H$). Upon a further decrease in the voltage at the cathodes of the diodes $D_X$, $D_Y$ due to the arrival of a second clamp pulse voltage A from the power supply "$e_A$", both the diodes $D_X$, $D_Y$ are rendered conductive, and the voltage difference between the C plate electrodes 44 and the C shield electrodes 43 becomes constant, so that no convergence error is produced. That is, when the high DC voltage $V_H$ applied to the C shield electrodes 43 varies, the voltage applied to the C plate electrodes 44 keeps up quickly with the voltage applied to the C shield electrodes 43.

Figure 21A:
FIGS. 21A through 21C are timing charts illustrative of operation of the dynamic convergence device according to the fifth embodiment.
Figure 21B:
Figure 21C:
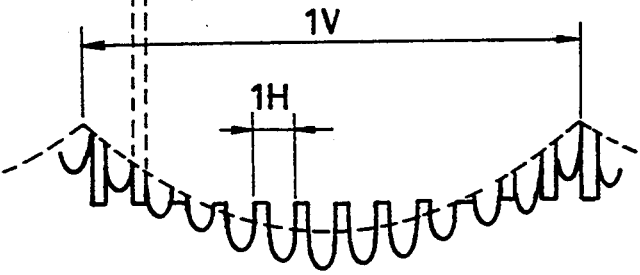

In the fifth embodiment, the voltage applied to the C plate electrodes 44 during other than clamping periods is free from a polarity limitation with respect to the high DC voltage $V_H$. It is also possible to employ complementary clamp pulse voltages and a dynamic convergence voltage as shown in FIGS. 21A through 21C, respectively, i.e., it is possible to correct convergence selectively positively or negatively from an uncorrected condition. Therefore, the degree of freedom for convergence adjustment is high.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A dynamic convergence device in a color cathode-ray tube, comprising:
   a color cathode-ray tube bulb;
   a pair of high-voltage electrode plates confronting each other disposed in said color cathode-ray tube bulb;
   a pair of low-voltage electrode plates disposed in said color cathode-ray tube bulb outwardly of said high-voltage electrode plates in confronting relationship thereto;
   said high- and low-voltage electrode plates being arranged such that a central electron beam will pass between said high-voltage electrode plates and side electron beams will pass between said high-voltage electrode plates and said low-voltage electrode plates;
   a high DC voltage source;
   a first parallel-connected circuit composed of a first resistor and a first diode which are connected between said low-voltage electrode plates and said high DC voltage source;
   a second parallel-connected circuit composed of a second resistor and a second diode which are connected between said high-voltage electrode plates and said high DC voltage source;
   a convergence voltage source for generating a convergence voltage which is composed of a vertical parabolic wave voltage added to a modulated voltage in horizontal blanking intervals thereof which is produced by amplitude-modulating a horizontal parabolic wave with a vertical parabolic wave;
   a first capacitor connected between said convergence voltage source and said low-voltage electrode plates or said high-voltage electrode plates; and
   a second capacitor connected between said low-voltage electrode plates or said high-voltage electrode plates and ground.

2. A dynamic convergence device according to claim 1, wherein said first capacitor and said first resistor jointly make up a time-constant circuit having a first predetermined time constant, and said second capacitor and said second resistor jointly make up a time-constant circuit having a second predetermined time constant.

3. A dynamic convergence device according to claim 2, wherein said first predetermined time constant and said second predetermined time constant are substantially equal to each other.

4. A dynamic convergence device in a color cathode-ray tube, comprising:
   a color cathode-ray tube bulb;
   a pair of high-voltage electrode plates confronting each other disposed in said color cathode-ray tube bulb;

a pair of low-voltage electrode plates disposed in said color cathode-ray tube bulb outwardly of said high-voltage electrode plates in confronting relationship thereto;

said high- and low-voltage electrode plates being arranged such that a central electron beam will pass between said high-voltage electrode plates and side electron beams will pass between said high-voltage electrode plates and said low-voltage electrode plates;

a high DC voltage source connected to said high-voltage electrode plates;

a first parallel-connected circuit composed of a first resistor and a first diode which are connected between said high-voltage electrode plates and said low-voltage electrode plates;

a second parallel-connected circuit composed of a second resistor and a second diode and having a terminal connected to said high-voltage electrode plates;

a convergence voltage source for generating a convergence voltage which is composed of a vertical parabolic wave voltage added to a modulated voltage in horizontal blanking intervals thereof which is produced by amplitude-modulating a horizontal parabolic wave with a vertical parabolic wave;

a first capacitor connected between said convergence voltage source and said low-voltage electrode plates;

a second capacitor connected between said convergence voltage source and an opposite terminal of said second parallel-connected circuit; and a third capacitor connected between said low-voltage electrode plates and said opposite terminal of said parallel-connected circuit.

5. A dynamic convergence device according to claim 4, wherein said first and second capacitors have equal capacitances, respectively, and said third capacitor has a capacitance larger than the capacitances of said first and second capacitors.

6. A dynamic convergence device in a color cathode-ray tube, comprising:

a color cathode-ray tube bulb;

a pair of high-voltage electrode plates confronting each other disposed in said color cathode-ray tube bulb;

a pair of low-voltage electrode plates disposed in said color cathode-ray tube bulb outwardly of said high-voltage electrode plates in confronting relationship thereto;

said high- and low-voltage electrode plates being arranged such that a central electron beam will pass between said high-voltage electrode plates and side electron beams will pass between said high-voltage electrode plates and said low-voltage electrode plates;

a high DC voltage source connected to said high-voltage electrode plates;

a first parallel-connected circuit composed of a first resistor and a first diode and having a terminal connected to said low-voltage electrode plates;

a second parallel-connected circuit composed of a second resistor and a second diode and having a terminal connected to said high-voltage electrode plates;

a convergence voltage source for generating a convergence voltage which is composed of a vertical parabolic wave voltage added to a modulated voltage in horizontal blanking intervals thereof which is produced by amplitude-modulating a horizontal parabolic wave with a vertical parabolic wave;

a first capacitor connected between said convergence voltage source and said low-voltage electrode plates;

a clamp pulse power supply for generating a clamp pulse voltage having horizontal periods;

a second capacitor connected between said clamp pulse power supply and opposite terminals of said first and second parallel-connected circuits; and a third diode connected between said high-voltage electrode plates and said low-voltage electrode plates.

7. A dynamic convergence device according to claim 6, wherein said first and second resistors have equal resistances, respectively, and said second capacitor has a capacitance slightly smaller than the capacitance of said first capacitor.

8. A dynamic convergence device in a color cathode-ray tube, comprising:

a color cathode-ray tube bulb;

a pair of high-voltage electrode plates confronting each other disposed in said color cathode-ray tube bulb;

a pair of low-voltage electrode plates disposed in said color cathode-ray tube bulb outwardly of said high-voltage electrode plates in confronting relationship thereto;

said high- and low-voltage electrode plates being arranged such that a central electron beam will pass between said high-voltage electrode plates and side electron beams will pass between said high-voltage electrode plates and said low-voltage electrode plates;

a high DC voltage source connected to said high-voltage electrode plates;

a first parallel-connected circuit composed of a first resistor and a first diode and having a terminal connected to said low-voltage electrode plates;

a second parallel-connected circuit composed of a second resistor and a second diode and having a terminal connected to said high-voltage electrode plates;

a third parallel-connected circuit composed of a third resistor and a third diode and having a terminal connected to said low-voltage electrode plates;

a fourth parallel-connected circuit composed of a fourth resistor and a fourth diode and having a terminal connected to said high-voltage electrode plates;

a convergence voltage source for generating a convergence voltage which is composed of a vertical parabolic wave voltage added to a modulated voltage in horizontal blanking intervals thereof which is produced by amplitude-modulating a horizontal parabolic wave with a vertical parabolic wave;

a first capacitor connected between said convergence voltage source and said low-voltage electrode plates;

a first clamp pulse power supply for generating a clamp pulse voltage having horizontal periods;

a second capacitor connected between said first clamp pulse power supply and opposite terminals of said first and second parallel-connected circuits;

a second clamp pulse power supply for generating a clamp pulse voltage having horizontal periods; and a third capacitor connected between said second clamp pulse power supply and opposite terminals of said third and fourth parallel-connected circuits.

9. A dynamic convergence device according to claim 8, wherein said first and second resistors have equal resistances, respectively, said third and fourth resistors have equal resistances, respectively, and said second and third capacitors have respective capacitances slightly smaller than the capacitance of said first capacitor.

* * * * *